(12) United States Patent
Dolph et al.

(10) Patent No.: US 11,857,985 B2
(45) Date of Patent: *Jan. 2, 2024

(54) AIRPOT BEVERAGE DISPENSER

(71) Applicant: Pacific Market International, LLC, Seattle, WA (US)

(72) Inventors: Matthew Kenneth Dolph, Seattle, WA (US); Ryan Michael Smith, Seattle, WA (US); Stephen Lake, Federal Way, WA (US); Andrew C. F. Wahl, Seattle, WA (US); Ping The Phan, Shoreline, WA (US)

(73) Assignee: Pacific Market International, LLC, Seattle, WA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/668,898

(22) Filed: Feb. 10, 2022

(65) Prior Publication Data
US 2022/0280961 A1 Sep. 8, 2022

Related U.S. Application Data

(63) Continuation of application No. 17/190,278, filed on Mar. 2, 2021, now Pat. No. 11,273,460.

(51) Int. Cl.
*B05B 11/00* (2023.01)
*B05B 11/10* (2023.01)
*A47J 41/00* (2006.01)

(52) U.S. Cl.
CPC ......... *B05B 11/104* (2023.01); *A47J 41/0033* (2013.01); *B05B 11/1047* (2023.01); *B05B 11/1059* (2023.01)

(58) Field of Classification Search
CPC ............... B05B 11/304; B05B 11/3047; B05B 11/3059; B67D 1/0425; B67D 1/0802; B67D 1/0871; A47J 41/0033
See application file for complete search history.

(56) References Cited

U.S. PATENT DOCUMENTS

| | | | |
|---|---|---|---|
| 3,905,520 A | 9/1975 | Nishioka | |
| 4,174,053 A | 11/1979 | Shimizu | |
| 4,290,537 A | 9/1981 | Chi-Jung | |
| 4,310,104 A | 1/1982 | Takatsuki | |
| 4,359,174 A | 11/1982 | Kunosuke et al. | |
| 4,622,889 A | 11/1986 | Chappell et al. | |
| 5,887,760 A | 3/1999 | Johnson | |
| 7,798,373 B1 | 9/2010 | Wroblewski et al. | |
| 7,954,666 B2 | 6/2011 | Webster et al. | |
| 2009/0108026 A1 | 4/2009 | Yu | |

*Primary Examiner* — Vishal Pancholi
(74) *Attorney, Agent, or Firm* — Merchant and Gould, PC

(57) ABSTRACT

An airpot beverage dispenser having a body with a beverage cavity, a lid with lower and upper lid portions, a bellows within the upper lid portion, an actuator for compressing the bellows to increase the pressure of trapped air in the bellows, a duckbill valve, a skirt valve extending fully around the duckbill valve, and a spout. The skirt valve is movable into sealing engagement with a lid lower wall to define an air flow path from the bellows to the beverage cavity, and when the pressure of the trapped air in the bellows is sufficiently increased, the duckbill valve opens and passes the trapped air to the beverage cavity to force beverage out the spout. When the spout is moved to a stored position and the dispenser is in a locked state, the skirt valve serves as a relief valve to prevent over pressure in the beverage cavity.

54 Claims, 27 Drawing Sheets ced tea, lemonade, ice water, hot water and the like.

AIRPOT BEVERAGE DISPENSER

BACKGROUND OF THE INVENTION

Field of the Invention

The present invention is directed generally to beverage containers, and more particular to an airpot beverage dispenser for serving beverages, such as freshly brewed coffee, iced tea, lemonade, ice water, hot water and the like.

Description of the Related Art

Airpot beverage dispensers have an insulated hollow body for storage of beverage and a pressurization system for forcing beverage to travel up a feed tube within the hollow body to a spout in fluid communication with the upper end of the feed tube. The spout dispenses the beverage at a location outside of the hollow body. Typically, a bellows is mounted within a cover assembly containing a movable bellows actuator, such as lever or push button that pushes downward on the top of a bellows to force air into the hollow body. When the bellows is actuated, the pressure within the hollow body is increased relative to atmospheric pressure and this pressure differential forces the beverage up the feed tube and out of the spout. The liquid contents are displaced with pressurized atmospheric air. Examples of airpot dispensers are shown in U.S. Pat. Nos. 4,290,537, 5,887,760 and 7,798,373, which are incorporated herein by reference in their entirety.

A relative advantage of this airpot design is that the spout is located adjacent the top of the airpot to enable the location of a coffee cup, carafe or the like beneath the spout without the need to support the bottom of the hollow body above the underlying support surface. Such support is required with beverage dispensers having a gravity feed faucet located at the bottom of the hollow body. Both gravity-feed faucet type beverage dispensers and airpot dispensers both have the advantage of not requiring the entire hollow body to be lifted and tipped to pour beverage from the top of the hollow body. In both types of dispensers, the contents are prevented from developing temperature equilibrium with the ambient air and resultant degradation of the beverage by means of insulation.

There are a number of problems associated with prior art airpot beverage dispensers, one being a phenomenon of auto or self-pumping. Another being pressure build up within the hollow body sufficient to damage the dispenser. If the pressure within the hollow body increases sufficiently, such as by the fermentation of beverage remaining within the hollow body for a long period of time, the internal pressure may cause destructive failure of the dispenser. Quickly ceasing the flow of liquid out the spout when the user ceases depressing the bellows actuator can also be an issue. Another problem is liquid leakage such as when the art pot beverage dispenser is carried about, or stored out of the vertical orientation.

Therefore, a need exists for a new design of an airpot beverage dispenser that over comes the problems discussed above. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 4:
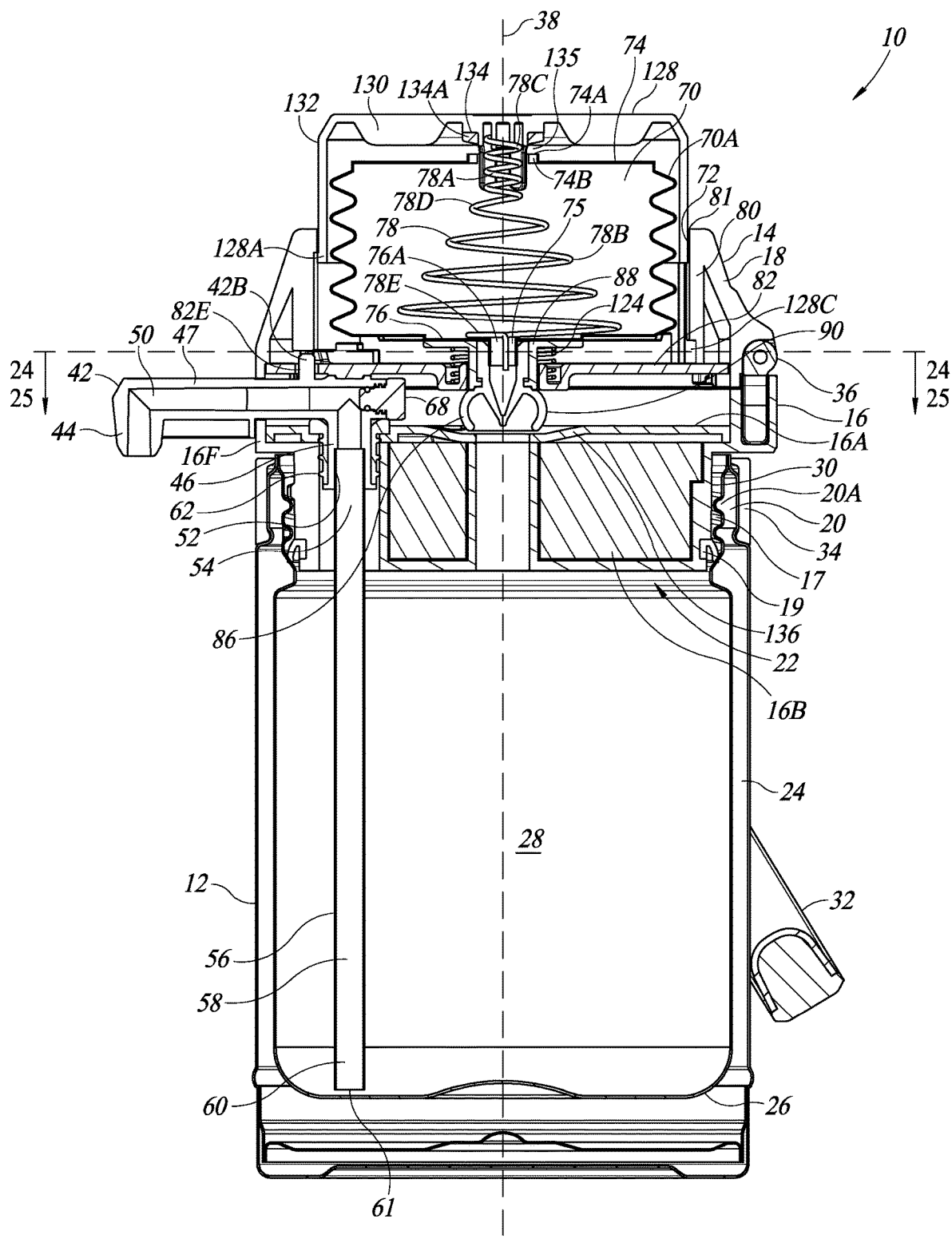
FIG. 4 is a left side cross-sectional view of the airpot beverage dispenser of FIG. 1 with the lid push button in the button up position.
Figure 5:
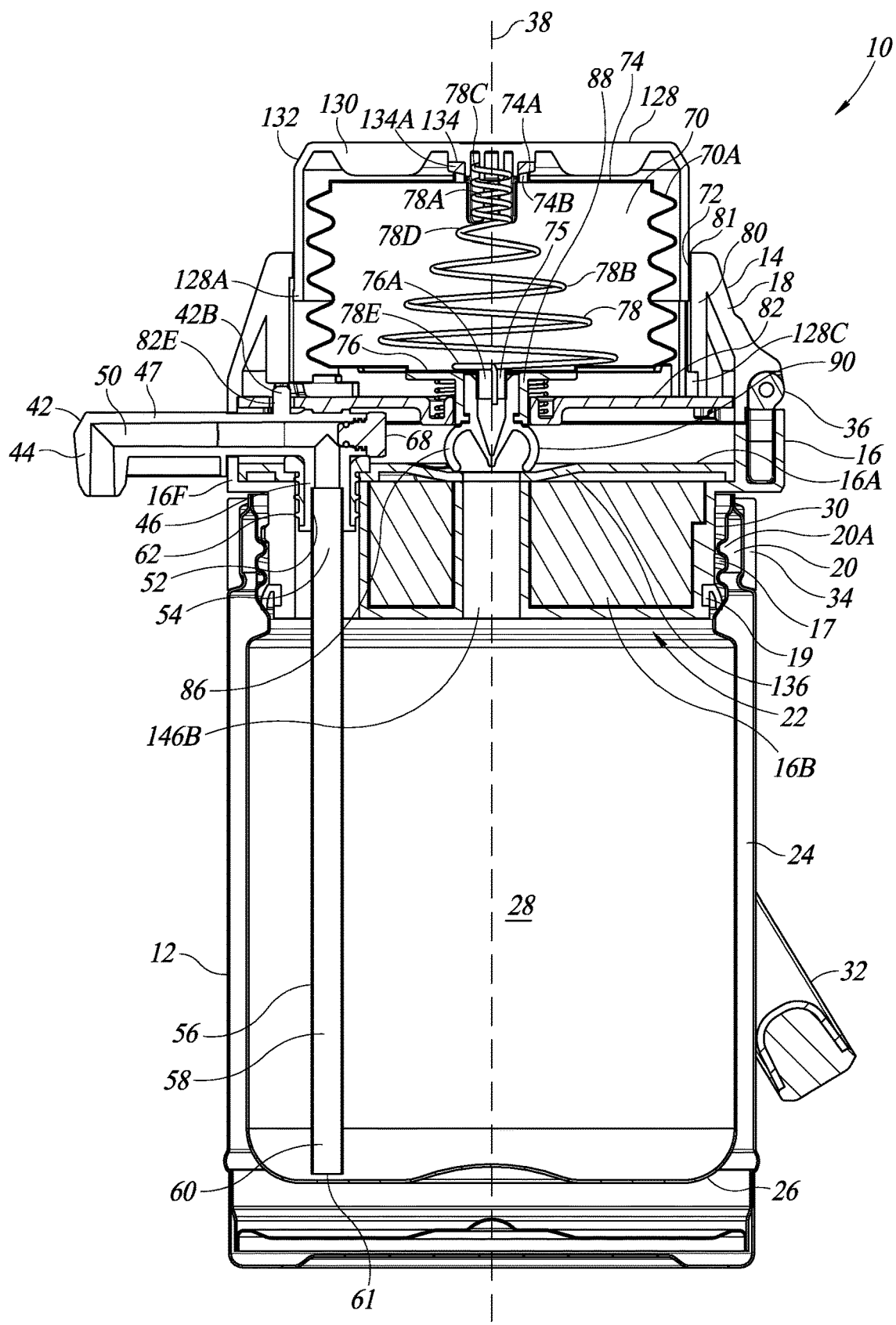
FIG. 5 is a left side cross-sectional view of the airpot beverage dispenser of FIG. 1 with the lid push button in a partially depressed button position.
Figure 6:
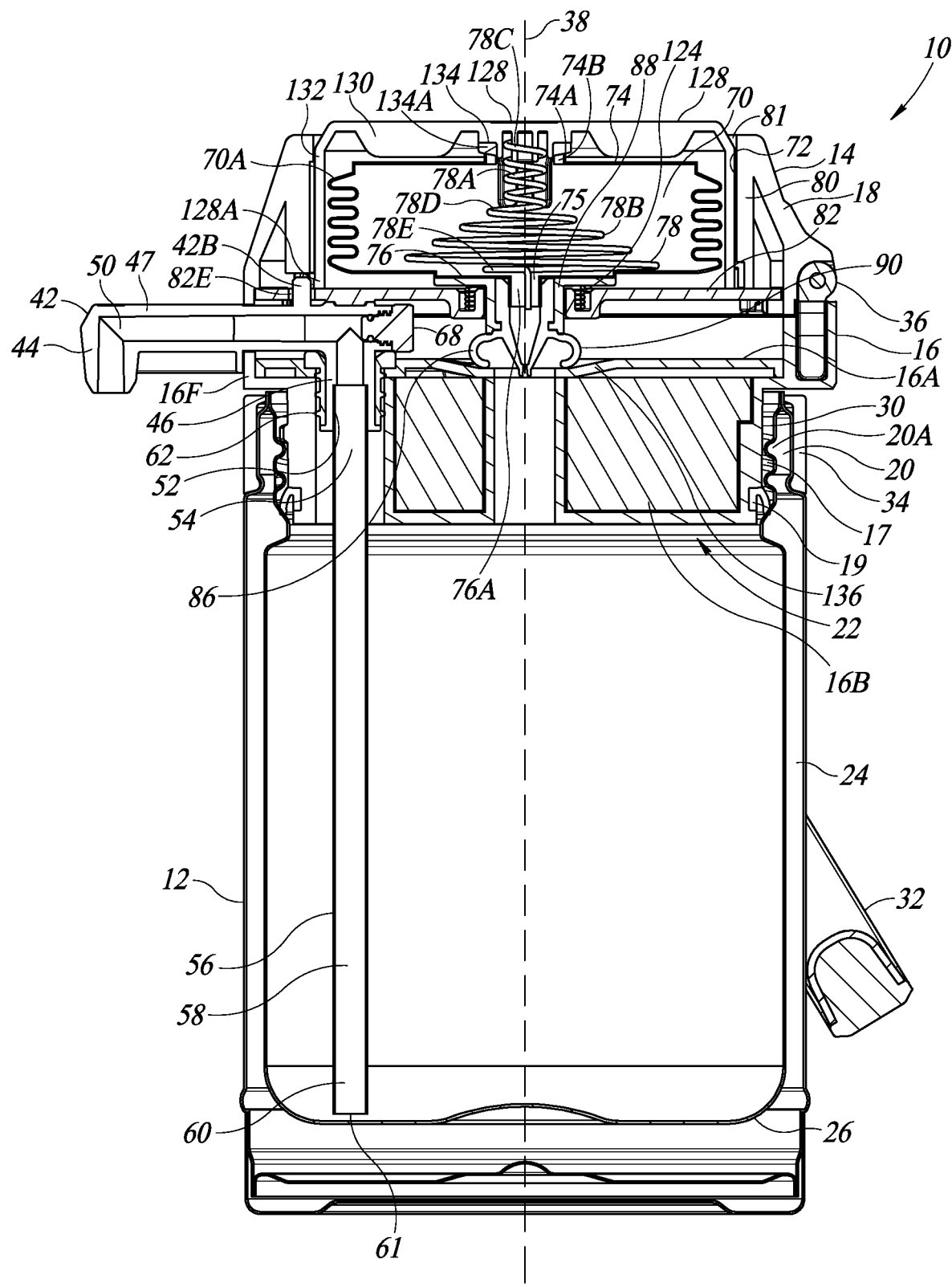
FIG. 6 is a left side cross-sectional view of the airpot beverage dispenser of FIG. 1 with the lid push button in a button down position.

An airpot beverage dispenser 10 for holding drinkable liquids. The dispenser 10 has an operating state for dispensing a liquid contained in the dispenser, and a leak-proof locked state in which the liquid cannot be dispensed and will not leak from the dispenser if not in an upright position or when being transported. The dispenser 10 is shown fully assembled in the operating state in FIGS. 1, 2 and 4-6, and in the locked state in FIG. 18. The dispenser 10 includes a substantially cylindrical container body 12 and a lid 14 having a lower lid portion 16 and an upper lid portion 18. As best seen in FIGS. 4-6, the container body 12 has an upper end portion 20 with an aperture 22, and a sidewall portion 24 extending downwardly from the upper portion 20 and closed at the lower end of the sidewall portion by a bottom wall 26 to define an interior beverage cavity 28 for holding hot or cold drinkable liquids therein. The exterior of a lower end portion 30 of the lower lid portion 16 has threads 17 and the interior of the upper portion 20 of the container body 12 has corresponding threads 20A for threadably attaching the lid 14 to the container body 12, but other means for removably coupling the lid to the container body may be used. A seal 19 extends about the lower lid portion 16 to provide a fluid-tight seal between the lower lid portion and the container body 12.

A bail handle 32 is rotatably attached to a collar 34 attached to the upper end portion 20 of the body 12 for carrying the dispenser 10.

Figure 7:
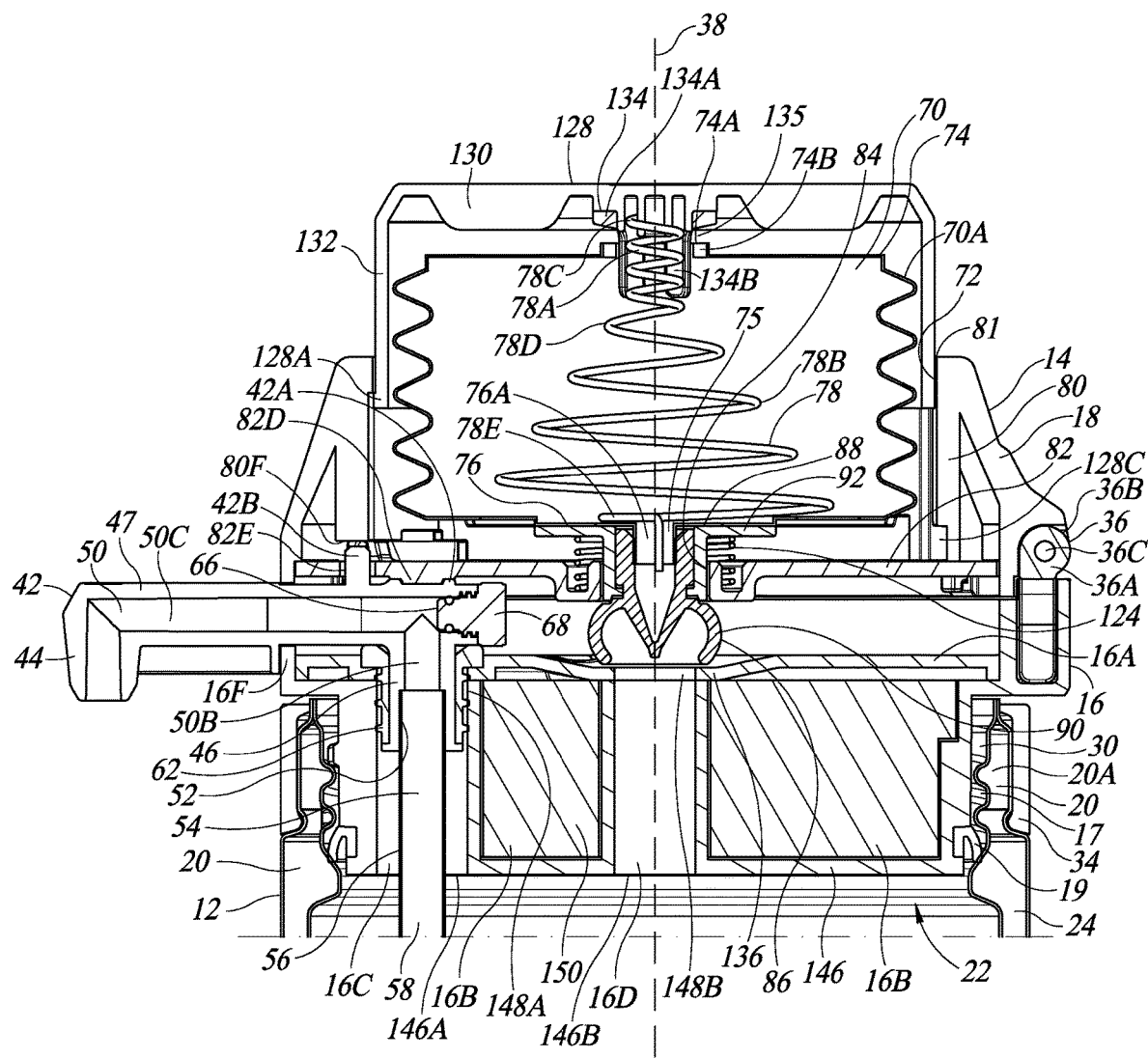
FIG. 7 is an enlarged, fragmentary, left side cross-sectional view of the airpot beverage dispenser corresponding to FIG. 4 with the lid push button in the button up position.
Figure 8:
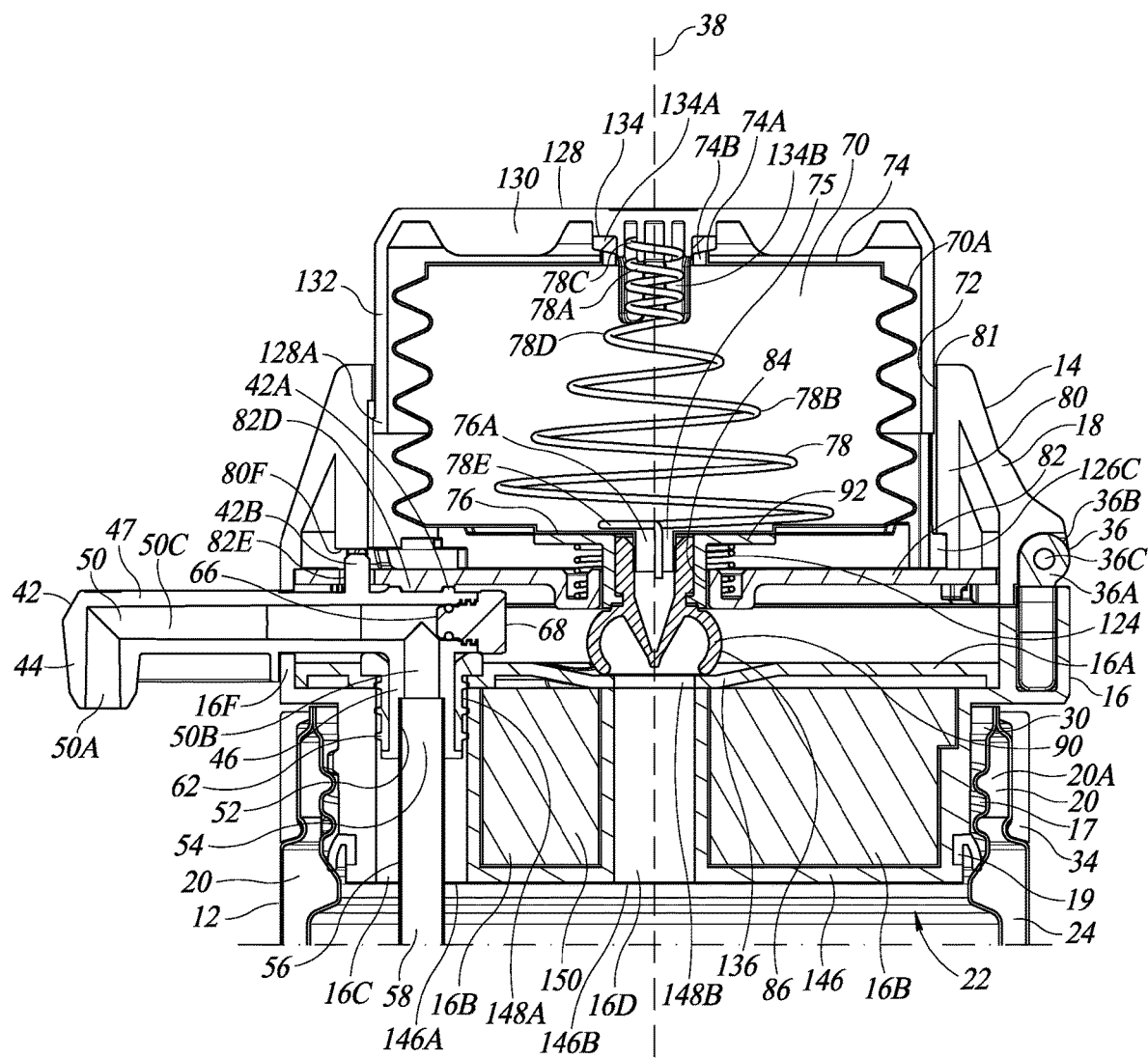
FIG. 8 is an enlarged, fragmentary, left side cross-sectional view of the airpot beverage dispenser corresponding to FIG. 5 with the lid push button in the partially depressed button position.

As best shown in FIGS. 7-8, the lower lid portion 16 includes a transversely extending upper wall 16A and a lower lid compartment 16B positioned below the upper wall 16A. The lower lid portion 16 has vertically oriented first and second through passageways 16C and 16D, respectively, extending fully through the upper wall 16A and the lower lid compartment 16B. The second through passageway 16D is in longitudinal alignment with a longitudinal axis 38 of the lid 14, and has a lower end in fluid communication with the beverage cavity 28. The first through passageway 16C is radially, outwardly offset from the second through passageway, and also has a lower end in fluid communication with the beverage cavity 28.

Figure 15:
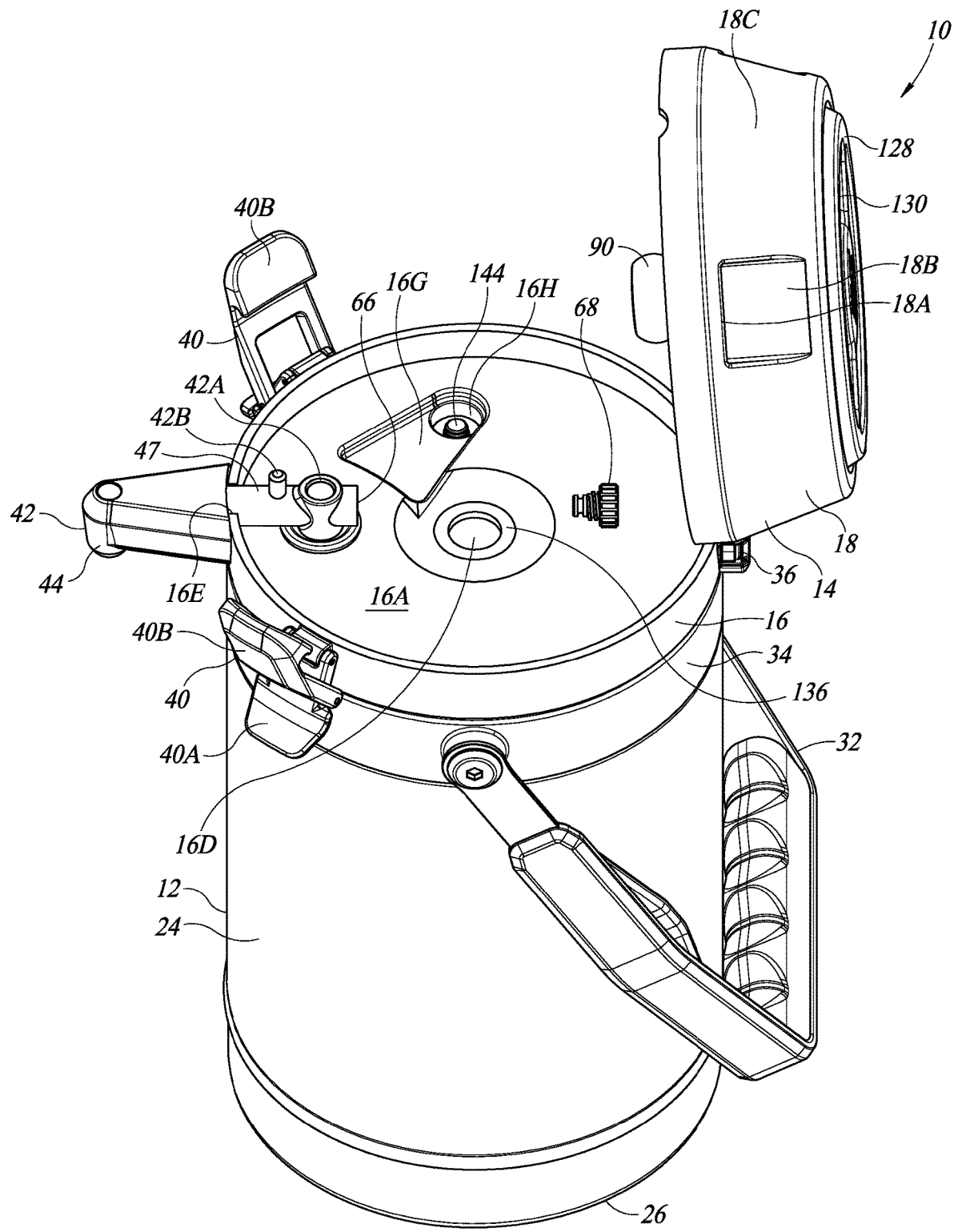
FIG. 15 is a rear, left side perspective view of the airpot beverage dispenser of FIG. 1 with the lid in an opened position.

The upper lid portion 18 is rotatably coupled to the lower lid portion 16 by a hinge 36 for rotation of the upper lid portion relative to the lower lid portion about an axis of rotation transverse to the longitudinal axis 38 of the lid 14 and container body 12. The lower lid portion 16 has a lower lid hinge member 36A, and the upper lid portion 18 has an upper lid hinge member 36B rotatably connected together by a hinge pin 36C. The lid 14 is rotatively movable between a closed position as shown in FIGS. 1, 2, 4-9, and 18 where the upper lid portion 18 is rotated downward relative to the lower lid portion 16 and is position adjacent thereto, and an opened position as shown in FIG. 15 where the upper lid portion is rotated upward relative to the lower lid portion.

Figure 1:
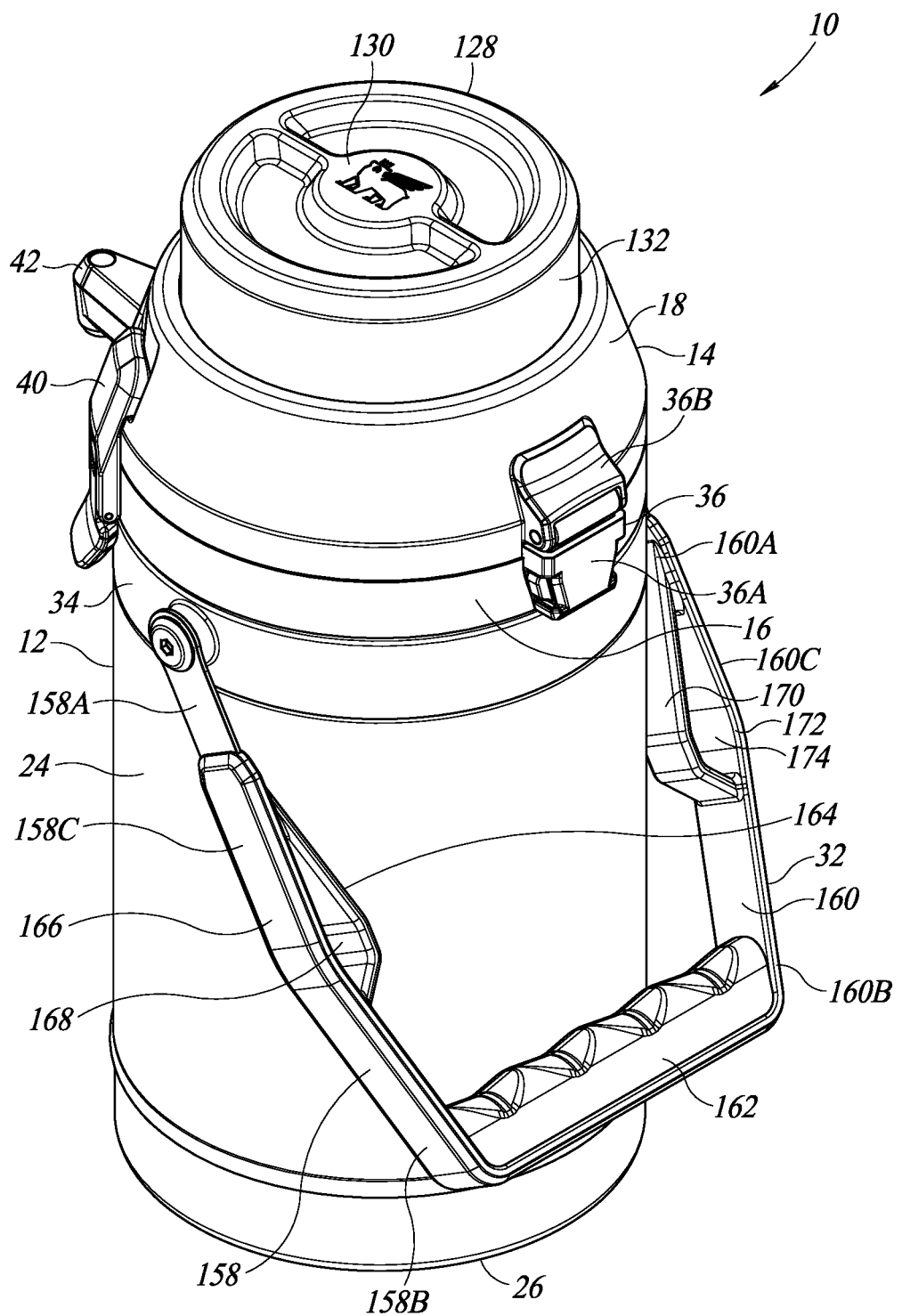
FIG. 1 is a rear, left side perspective view of an airpot beverage dispenser having a body and a lid, with a lid push button in a button up position.
Figure 2:
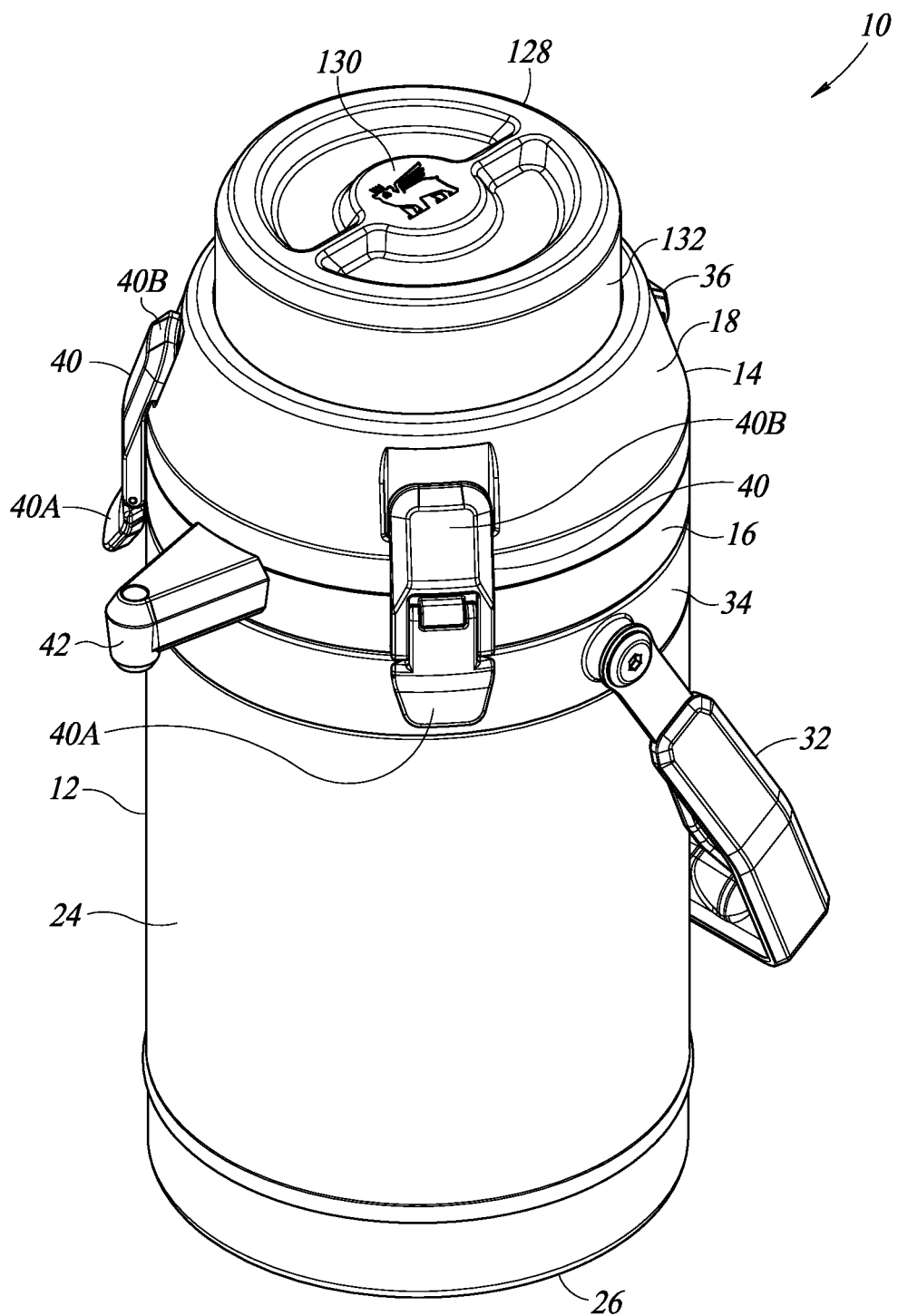
FIG. 2 is a front, left side perspective view of the airpot beverage dispenser of FIG. 1.
Figure 3:
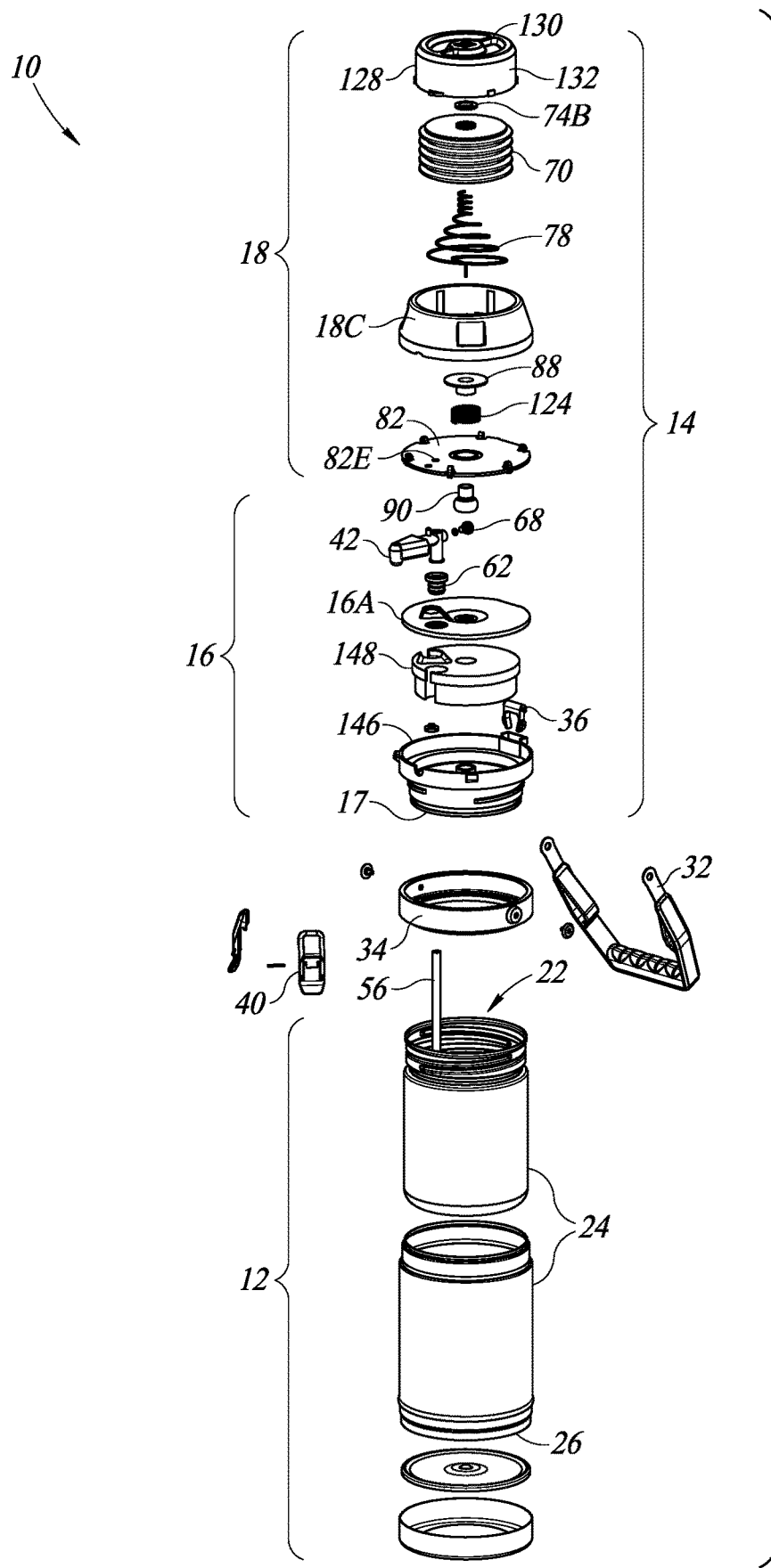
FIG. 3 is an exploded perspective view of the airpot beverage dispenser of FIG. 1.
Figure 18:
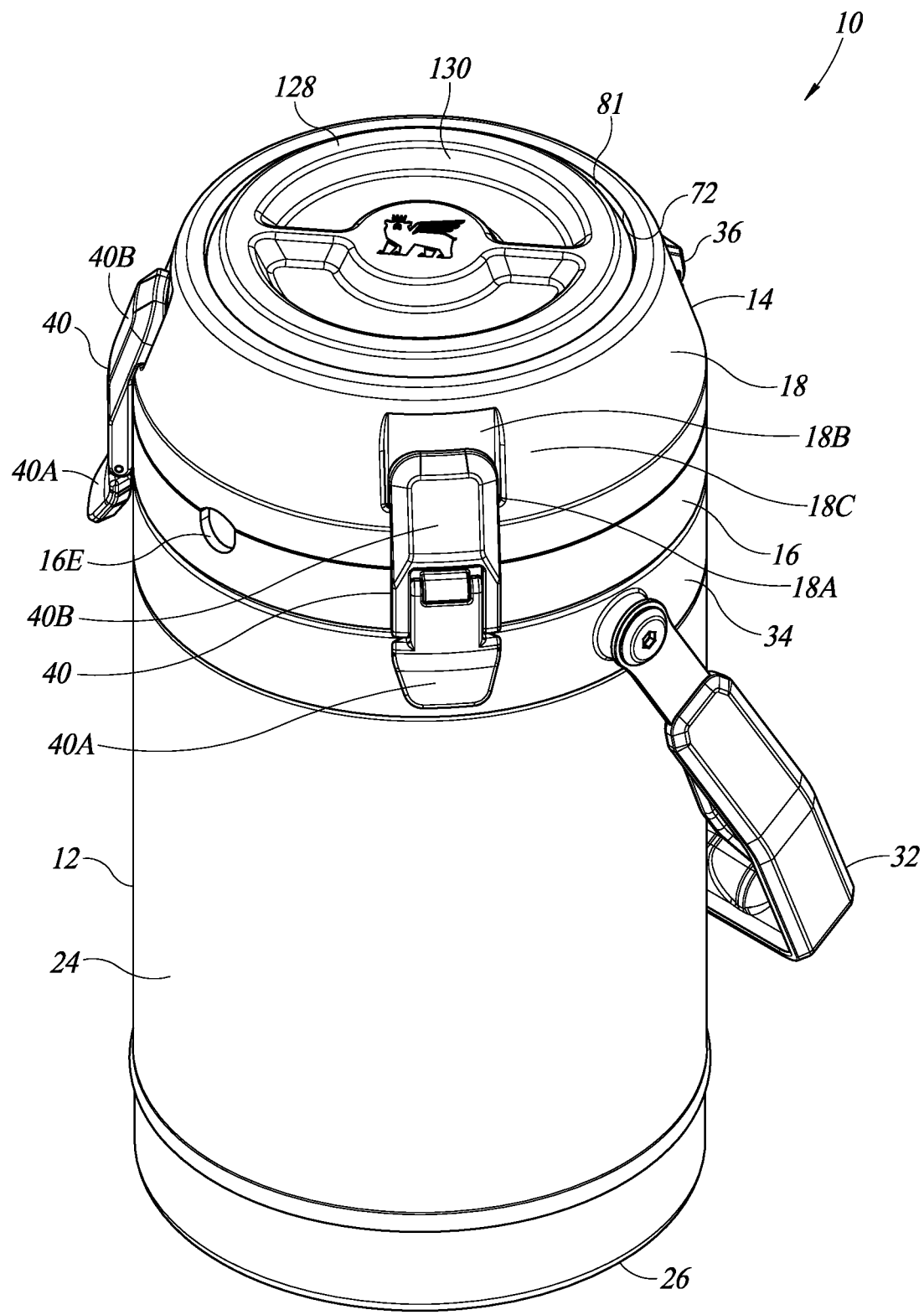
FIG. 18 is a front, left side perspective view of the airpot beverage dispenser of FIG. 1 with the spout in the stored position.

When in the lid 14 is in the closed position, the upper lid portion 18 may be secured to the lower lid portion 16 in the closed position by two latches 40, as shown in FIGS. 1, 2 and 18. The upper lid portion 18 may be unlatched from the lower lid portion 16 when it is desired to rotate the lid 14 to the opened position as shown in FIG. 15, such as for putting a drinkable liquid in the beverage cavity 28 for dispensing from the dispenser 10, for cleaning of the dispenser or putting the dispenser in the locked state, as will be described in greater detail below. When the lid 14 is in the closed position with each of the two latches 40 latched, a lower end of a lower latch portion 40A is rotatably connected to the lower lid portion 16, an upper end of the lower latch portion is hinged to a lower end of an upper latch portion 40B, and the upper end of the upper latch portion extends or is hooked over an outward edge 18A of a depression 18B in an outer sidewall 18C of the upper lid portion 18 (best seen in FIG. 15 showing the lid in the opened position).

As shown in FIGS. 4-9, the dispenser 10 includes a spout 42 supported by the lower lid portion 16 for dispensing or discharge of liquid from within the beverage cavity 28. The spout 42 is movable between a dispensing position shown in FIGS. 4-6 and 7-9, and a stored position shown in FIG. 17. FIG. 18 shows the exterior of the dispenser 10 when the spout 42 is in the stored position within the lid 14 and not visible. The spout 42 has a spout head portion 43 with a downturned, discharge outer end spout portion 44 located outward of the container body 12 and the lower lid portion 16, and a vertically oriented, inward end spout portion 46 positioned in the vertically oriented first through passageway 16C of the lower lid portion, with a laterally extending middle spout portion 47 extending between the outer end spout portion 44 and the inward end spout portion 46. An internal fluid conducting spout channel 50 extends through the outer end spout portion 44, the middle spout portion 47 and the inward end spout portion 46. An inward end portion of the spout channel 50 of the inward end spout portion 46 has an enlarged opening 52 sized to removably receive therein in fluid tight sealing engagement, an upper end portion 54 of a spout conduit portion, referred to herein as a feed tube or straw 56.

As shown in FIGS. 4-6, the straw 56 has an internal fluid conducting straw channel 58 extending between an upper straw end portion 54 and a lower straw end portion 60. The straw channel 58 is in fluid communication with the inward end portion of the spout channel 50 and has a lower end straw opening 61 positioned adjacent to the bottom wall 26 of the body container 12 for conducting liquids in the beverage cavity 28 upwards through the straw channel 58 to and through the spout channel 50, for discharge from the outer end spout portion 44 for deposit in a drink container (not shown) for drinking. When the spout 42 is in the dispensing position, the straw 56 enables a user to draw liquid from within the beverage cavity 28 without having to tip the dispenser 10 for pouring, as will be described in greater detail below. In the illustrated embodiment, the spout head portion 43 is not removable from the straw 56.

A seal 62 is positioned between the inward end spout portion 46 and the inner wall of the first through passageway 16C of the lower lid portion 16 to provide a fluid-tight seal therebetween, while allowing the inward end spout portion to rotate within the first through passageway and be moved upward and downward in the first through passageway as needed when the user is moving the spout 42 between the dispensing position and the stored position. It is noted that while the spout 42 is removable from the lower lid portion 16, the spout need not be removed to move the spout between the dispensing position and the stored position.

The spout channel 50 includes an upright first channel portion 50A extending within the outer end spout portion 44, an upright second channel portion 50B extending within the inward end spout portion 46, and a laterally extending third channel portion 50C extending within a laterally extending middle spout portion 47. The spout head portion 43 has an aperture 66 in the wall of the spout channel 50 at the inward end of the middle spout portion 47 of the spout channel 50, sized to removably receive a plug 68 therein (just above the upper end of the second channel portion 50B). The aperture 66 is in straight alignment with the third channel portion 50C to provide easy access the third channel portion 50C for cleaning of the third channel portion, which is positioned between two right angle bends in the spout channel 50.

To dispense the liquid from within the beverage cavity 28 through the spout 42, the dispenser 10 has a bellows 70 positioned at least partially within an upwardly open chamber 72 within the upper lid portion 18 in longitudinal alignment with the longitudinal axis 38 of the lid 14 (see FIGS. 4-10, 26B and 27B). The bellows 70 has an upper bellows end wall 74 with an upper bellows end aperture 74A and a lower bellows end wall 76 with a lower bellows end aperture 76A. The upper and lower bellows end apertures 74A and 76A are centrally located in alignment with the longitudinal axis 38 of the lid 14. A tubular bellows collar 75 has an upper end and a lower end, with a fluid channel extending therebetween. The upper end of the bellows collar 75 is attached to the lower bellows end wall 76 with the upper end of the fluid channel of the bellows collar in fluid communication with the lower bellows end aperture 76A.

A bellows spring 78 has a cylindrical upper spring end portion 78A and a conical lower spring end portion 78B. The lower spring end portion 78B is positioned within the bellows 70, and the upper spring end portion 78A extends through the upper bellows end aperture 74A and has an upper end 78C terminating above the upper bellows end wall 74. As will be described below, the bellows 70 may be compressed/collapsed in the process of dispensing the liquid from within the beverage cavity 28. The bellows 70 of the illustrated embodiment has a sufficiently resilient corrugated outer wall 70A that after being collapsed, the outer wall acts as in integral spring that moves the upper bellows end wall 74 upward and expands the bellows once the downward force being applied by a user is removed. However, in an alternative embodiment, a lower portion 78D of the upper spring end portion 78A may be in driving engagement with the interior side of the upper bellows end wall 74 to supply additional upward return force to assist in moving the upper bellows end wall upward to expand the bellows 70 after being collapsed. A lower portion 78E of the lower spring end portion 78B is in contact with the interior side of the lower bellows end wall 76.

Figure 9:
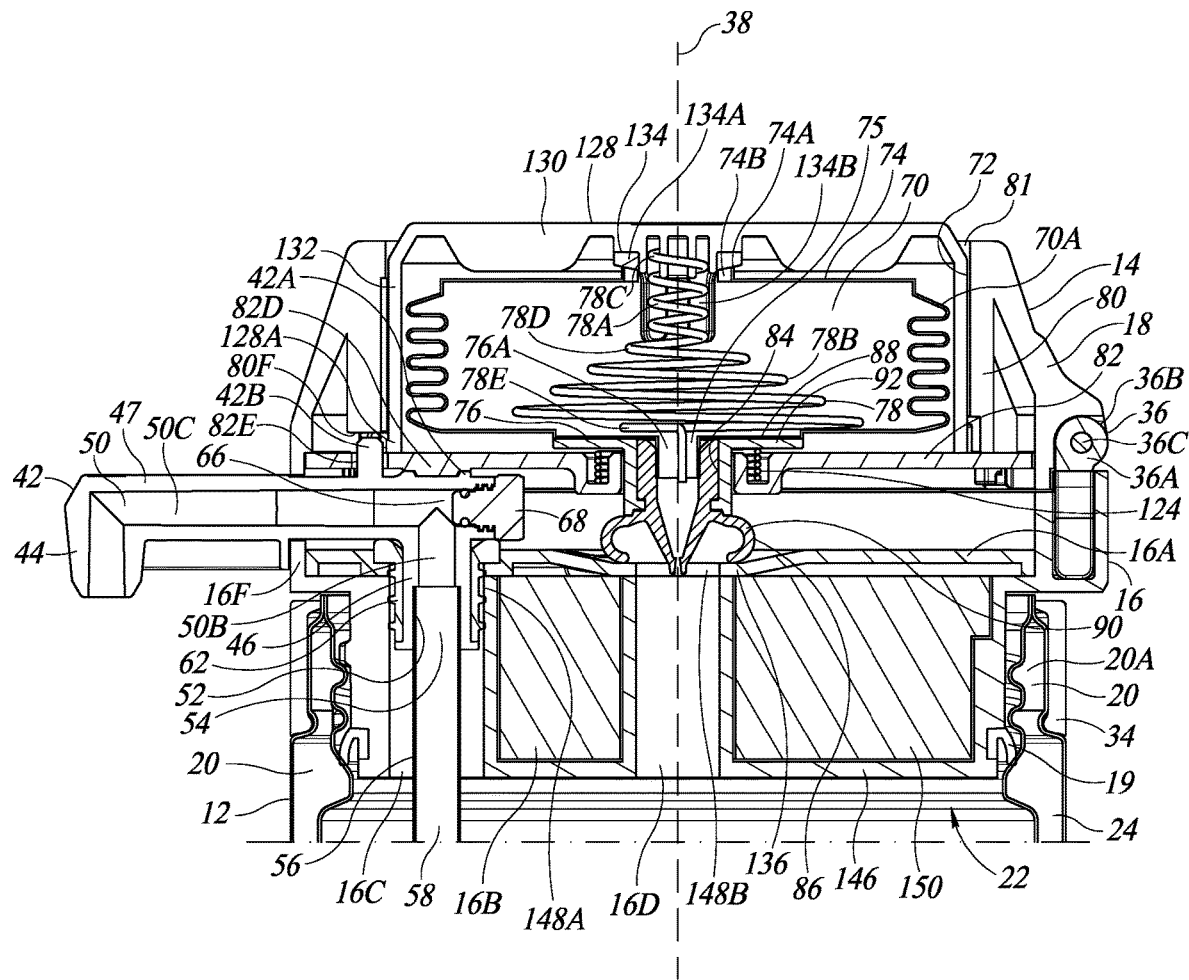
FIG. 9 is an enlarged, fragmentary, left side cross-sectional view of the airpot beverage dispenser corresponding to FIG. 6 with the lid push button in the button down position.
Figure 10:
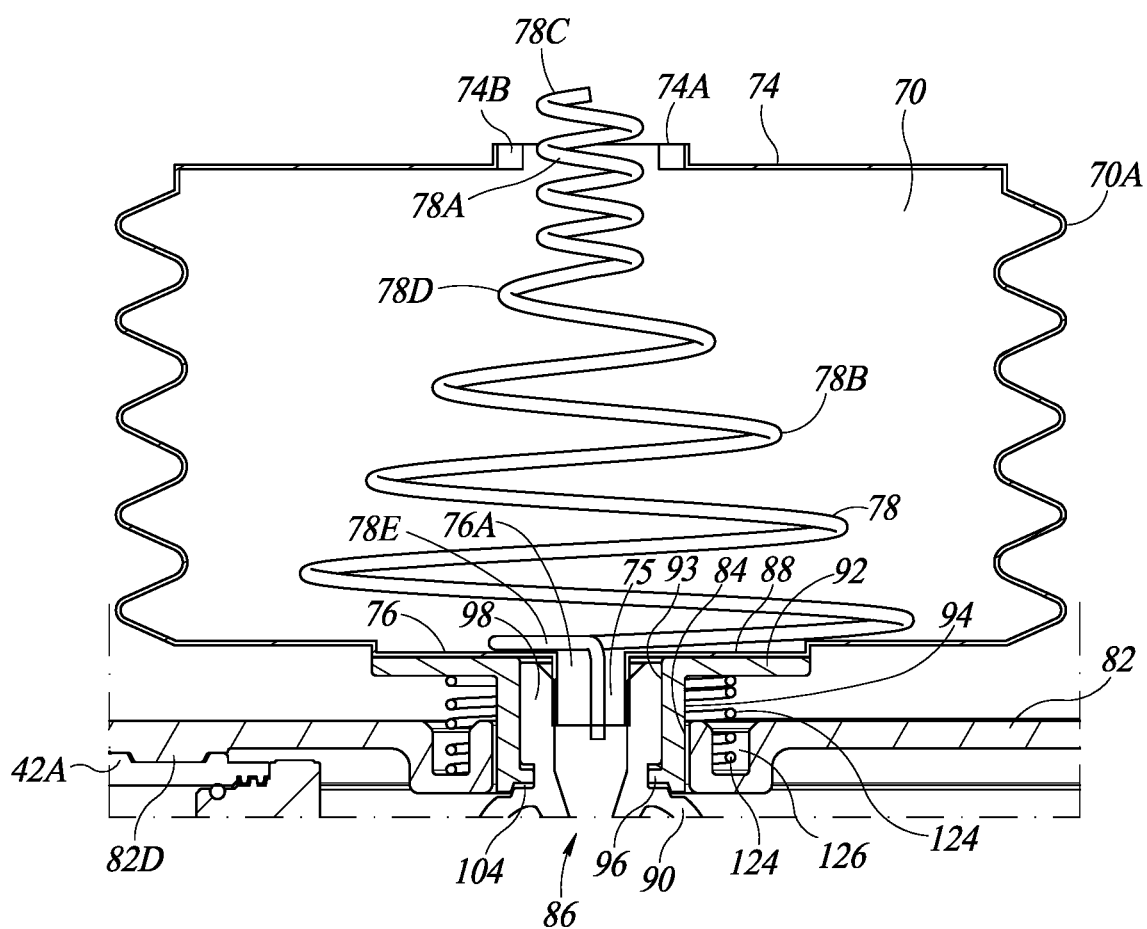
FIG. 10 is an enlarged, fragmentary, left side cross-sectional view of the bellows of the airpot beverage dispenser of FIG. 1 when the lid push button is in the button up position.

The chamber 72 within which the bellows 70 is positioned has a circumferentially extending, cylindrical chamber sidewall 80, an open upper chamber end 81, and a transversely extending chamber bottom wall 82 located below the lower bellows end wall 76 and within the upper lid portion 18. The chamber bottom wall 82 has a chamber bottom wall aperture 84 centrally located in alignment with the longitudinal axis 38 of the lid 14, as best shown in FIGS. 7-9.

As shown in FIGS. 7-14, a valve assembly 86 has a valve support member 88 and a valve 90. The valve support member 88 includes an annular flange portion 92 with a central flange aperture 93 and a circumferentially extending sidewall portion 94 projecting downward from the flange portion and extending circumferentially about the central flange aperture. The flange portion 92 is attached to the lower bellows end wall 76 and the central flange aperture 93 is in alignment with the longitudinal axis 38 of the lid 14 and the lower bellows end aperture 76A. The sidewall portion 94 extends through the chamber bottom wall aperture 84 for downward and upward axial movement of the valve support member 88 relative to the chamber bottom wall 82, as the bellows is compressed/collapsed and expanded, respectively. A lower end portion of the sidewall portion 94 has an inwardly projecting circumferentially extending valve retainer ridge 96.

The valve 90 has a tubular downwardly extending valve base portion 98, a duckbill valve portion 100, and a skirt valve portion 102. The duckbill valve portion 100 and the skirt valve portion 102 are coaxially arranged and extend downward from the valve base portion 98. The valve base portion 98 is positioned within the sidewall portion 94 of the valve support member 88 and has a longitudinally extending fluid channel in alignment with the longitudinal axis 38 of the lid 14. The bellows collar 75 extends downward from the lower bellows end wall 76 through the central flange aperture 93 and into the interior of the valve base portion 98 within the fluid channel of the valve base portion. The valve base portion 98 has an exterior circumferentially extending groove 104, which when the valve base portion is positioned within the sidewall portion 94 of the valve support member 88, receives the retainer ridge 96 of the sidewall portion therein to securely hold the valve 90 in place during operation of the valve assembly 86.

Figure 11:
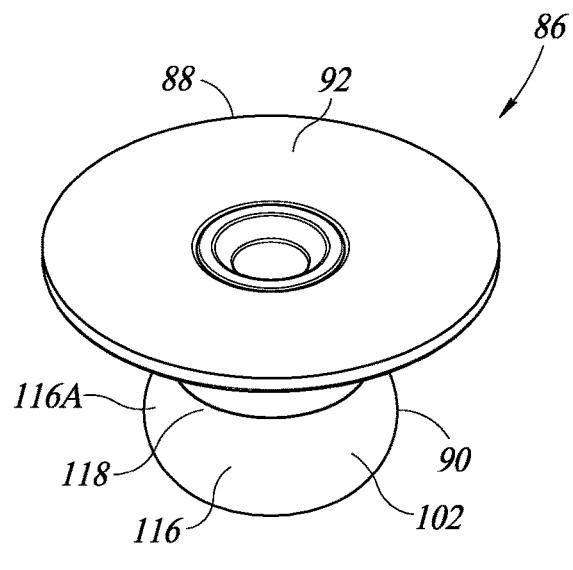
FIG. 11 is an enlarged, top perspective view of a valve assembly of the airpot beverage dispenser of FIG. 1 shown removed from the dispenser.
Figure 11A:
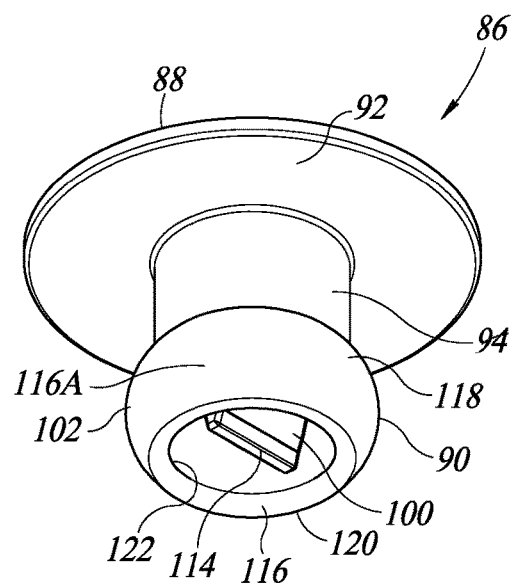
FIG. 11A is a bottom perspective view of the valve assembly of FIG. 11.
Figure 11B:
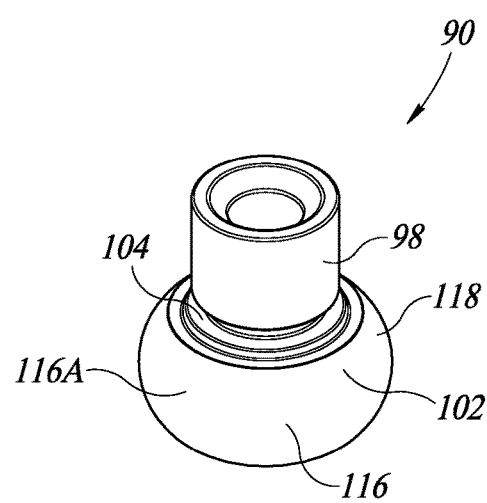
FIG. 11B is a top perspective view of a valve of the valve assembly of FIG. 11.
Figure 11C:
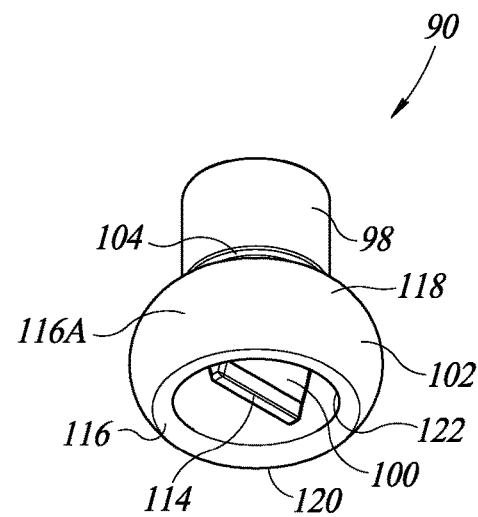
FIG. 11C is a bottom perspective view of the valve of the valve assembly of FIG. 11.
Figure 12:
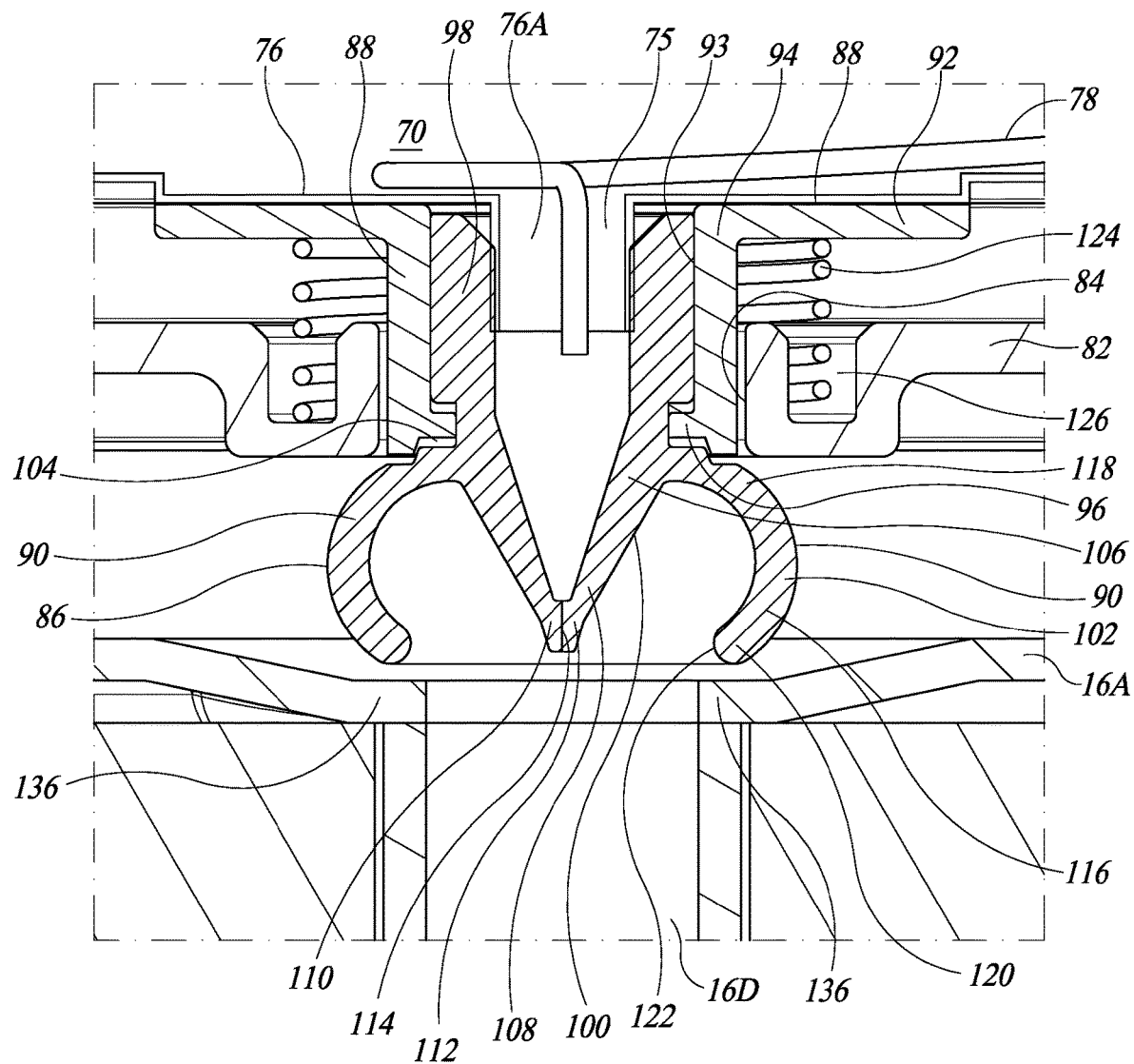
FIG. 12 is an enlarged, fragmentary, left side cross-sectional view of the airpot beverage dispenser corresponding to FIGS. 4 and 7 with the lid push button in the button up position.
Figure 13:
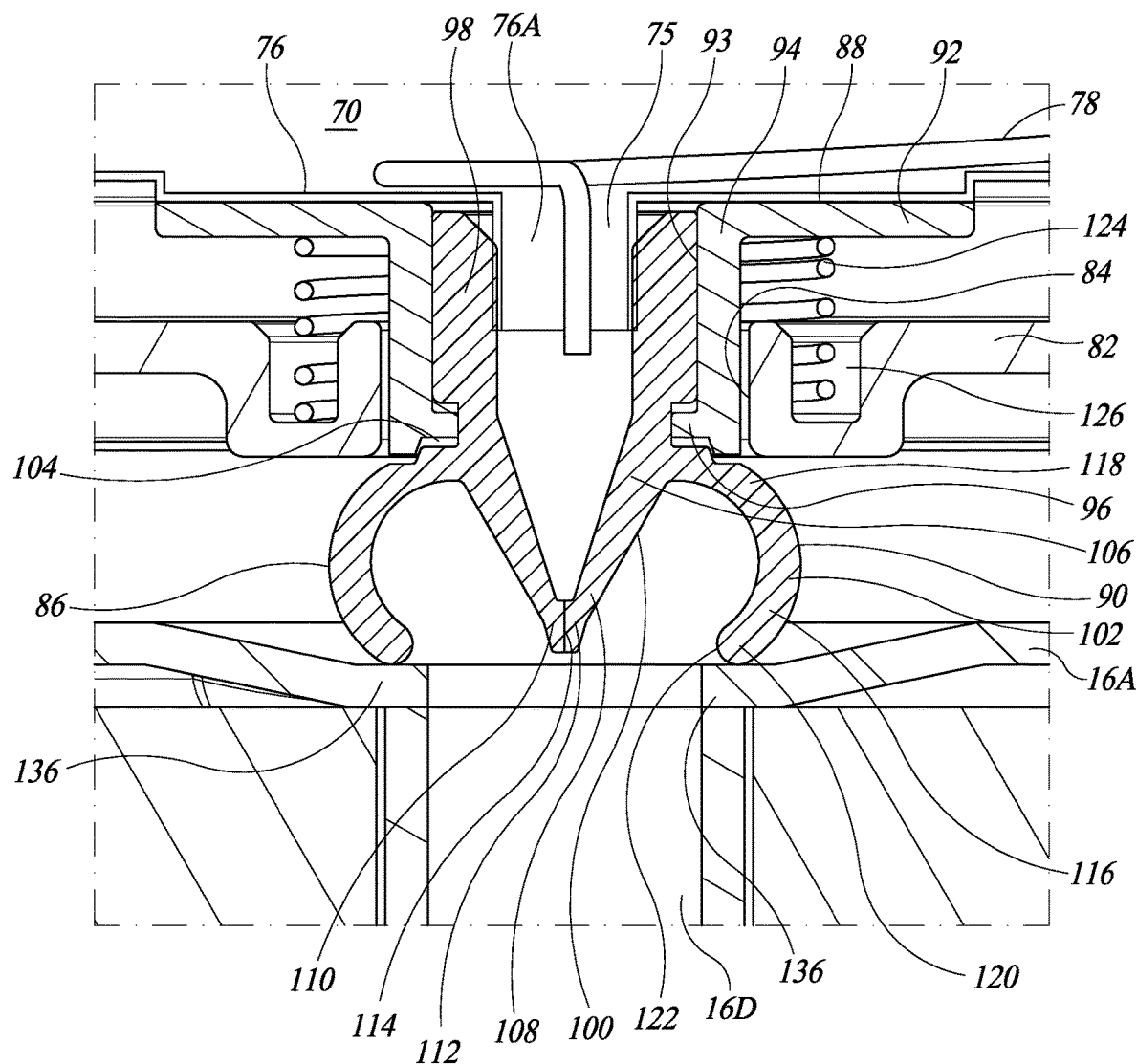
FIG. 13 is an enlarged, fragmentary, left side cross-sectional view of the airpot beverage dispenser corresponding to FIGS. 5 and 8 with the lid push button in the partially depressed button position.
Figure 14:
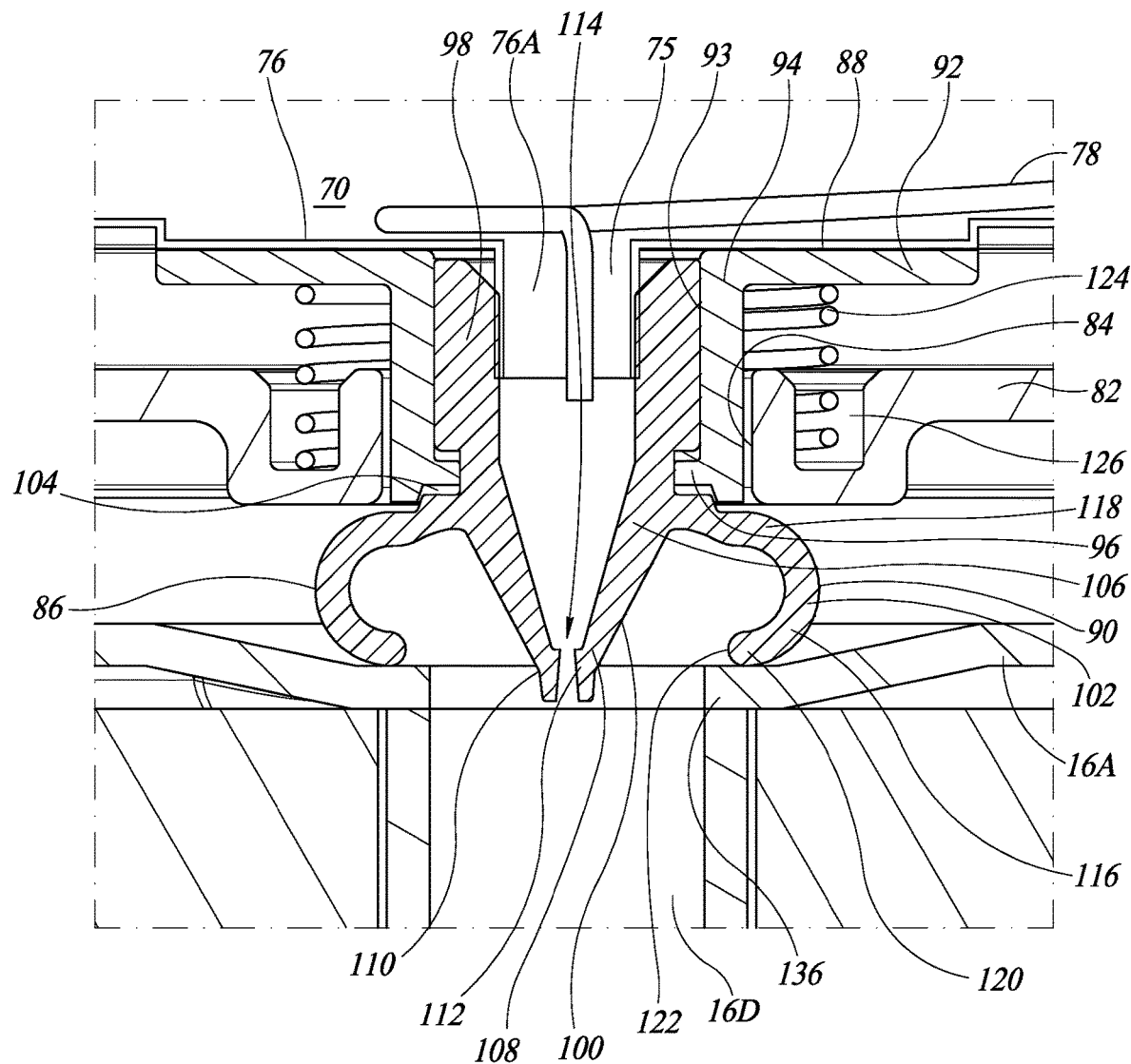
FIG. 14 is an enlarged, fragmentary, left side cross-sectional view of the airpot beverage dispenser corresponding to FIGS. 6 and 9 with the lid push button in the button down position.

The duckbill valve portion 100 of the valve 90 has an upper end portion 106 attached to the lower end of the valve base portion 98 and a lower end portion 108 with two opposing sidewalls 110 and 112. The lower ends of the opposing sidewalls 110 and 112 have a normally closed exit aperture or slit 114 extending between them. The duckbill valve portion 100 is a one-way valve only permitting downward air flow out of the lower bellows end aperture 76A when the duckbill valve portion is opened. The skirt valve portion 102 of the valve 90 has a skirt wall 116 extending fully around the duckbill valve portion 100. An upper end portion 118 of the skirt wall 116 is attached to the upper end portion 106 of the duckbill valve portion 100, and a lower end portion 120 of the skirt wall defines a central aperture 122. The skirt wall 116 is convex in curvature in vertical profile (a mid-portion 116A having a larger diameter or transverse wall separation dimension than either one of the upper and lower end portions 118 and 120, see FIGS. 11-11C), and at least one of the lower end portion and mid-portion, and preferably both are flexible enough to flex under a sufficiently high pressure within the beverage cavity 28 of the container body 12 (e.g., 50 psi), to act as a blow off or relief valve, as will be explained in more detail below.

A coil return spring 124 is positioned between the flange portion 92 of the valve support member 88 (and hence the lower bellows end wall 76) and the chamber bottom wall 82 of the chamber 72, with the sidewall portion 94 of the valve support member positioned within the coils of the return spring. The chamber bottom wall 82 has an upwardly opening spring retainer groove 126 extending about the chamber bottom wall aperture 84 for receiving a lower end of the return spring 124. An upper end of the return spring 124 is in engagement with the flange portion 92 of a valve assembly 86. The return spring 124 assists in upward return movement of the valve assembly 86 after having been moved downward, as will be described below.

An actuator or push button 128 is used to manually move the upper bellows end wall 74 downward to cause discharge of liquid from within the beverage cavity 28 when the dispenser 10 is in the operating state. The push button 128 has a button top wall 130 positioned above the upper bellows end wall 74 and spanning across the upper bellows end wall, and a circumferentially extending, cylindrical button sidewall 132 extending downward from the button top wall (in the general shape of an inverted cup) and terminating in a button sidewall lower end 128A positioned within the chamber 72 of the upper lid portion 18 for reciprocal movement within the chamber along the longitudinal axis 38 of the lid 14. The button top wall 130 is positioned above a chamber sidewall upper end 80A of the chamber sidewall 80, and the button sidewall 132 extends downward sufficiently that the button sidewall lower end 128A is below and inward of the chamber sidewall upper end 80A, and as the push button 128 is depressed by a user and the bellows 70 is vertically compressed or collapsed (see movement sequence in FIGS. 4-6 and in FIGS. 7-9 showing downward movement of the pushbutton), the extent of the button sidewall 132 within the chamber sidewall increases. The upper end 78C of the upper spring end portion 78A of the bellows spring 78 engages the underside of the button top wall 130.

A best seen in FIGS. 7-9, a button valve 134 is attached to the underside of the button top wall 130 in coaxial alignment with the longitudinal axis 38 of the lid 14 and upper bellows end aperture 74A. The button valve 134 includes an annular seal 134A and centrally located, downwardly projecting alignment members 134B that project into the upper bellows end aperture 74A and around the upper spring end portion 78A to help maintain proper coaxial alignment of the button valve with the upper bellows end aperture and capture the upper spring end portion therebetween. An annular valve seat 74B is attached to the upper bellows end wall 74 and positioned within and extends about the upper bellows end aperture 74A in coaxially arrangement with the upper bellows end aperture. When the push button 128 is in a raised position (i.e., a fully upward position), as shown in FIGS. 1, 2, 4 and 7, that is, it has not been pressed downward by a user and hence the bellows 70 are not vertically collapsed the seal 134A of the button valve 134 is positioned above and spaced apart from the valve seat 74B (see gap 135 in FIGS. 4 and 7) and the upper bellows end aperture 74A is open. It is to be understood that the button valve may be constructed with the seal 134A attached to the upper bellows end wall 74 and the valve seat 74B attached to the underside of the button top wall 130.

When the dispenser 10 is in the operating state, as the user begins to press the push button 128 downward to start the liquid dispensing process, the bellows spring 78 begins to collapse downward and the seal 134A moves downward with the downward movement of the push button. With sufficient downward movement of the push button 128, the gap 135 closes and the seal 134A moves into fluid tight sealing engagement with the valve seat 74B, and thereby closes the upper bellows end aperture 74A (see FIGS. 5 and 8). Since the duckbill valve portion 100 is closed, this traps the air within the bellows 70 so that the air can be compressed under the continued downward force applied by the user to the push button 128 for application of that pressure to the air space above the liquid within the beverage cavity 28. It is noted that in this position the skirt valve portion 102 may be in contact with but likely not in fluid tight sealing engagement with an annular valve seat portion 136 of the upper wall 16A of the lower lid portion 16 (see FIGS. 5, 8 and 13).

As the user continues to press the push button 128 downward, the bellows 70 moves farther downward and the pressure of the air trapped within the bellows 70 progressively increases. When the downward force applied by the user on the push button 128 exceeds the spring force of the return spring 124 positioned between the flange portion 92 of the valve support member 88 and the chamber bottom wall 82 of the chamber 72, the lower bellows end wall 76 and the valve assembly 86 attached thereto move downward toward the upper wall 16A of the lower lid portion 16. This moves the lower end portion 120 of the skirt wall 116 of the skirt valve portion 102 downward into fluid tight sealing engagement with the annular valve seat portion 136 of the upper wall 16A of the lower lid portion 16 (see FIGS. 6, 9 and 14). In this position, the mid-portion of the flexible skirt wall 116 of the skirt valve portion 102 is more outwardly deformed (i.e., the mid-portion 116A bulging more radially outward beyond the upper and lower end portions 118 and 120) than in the previously described positions of the skirt wall. As the lower end portion 120 of the skirt wall 116 of the skirt valve portion 102 is moved downward after the initial contact with the annular valve seat portion 102, the shape of the skirt wall 116 tends to deflect or deform with the mid-portion 116A of the flexible skirt wall progressively bowing outward farther with a smoothly curved shape without any sharp bends.

Continued downward force applied by the user to the push button 128 and the resulting further compressing of the bellows 70 causes the air pressure trapped within the bellows 70 to eventually reach a pressure level sufficient to force open the duckbill valve portion 100 (i.e., the two opposing sidewalls 110 and 112 at the lower end portion 108 of the duckbill valve portion separate at the slit 114). This forms an air passageway for the pressurized air in the bellows 70 to flow downward through the tubular bellows collar 75, then through the fluid channel of the valve base portion 98, then through the opened slit 114 of the duckbill valve portion 100, through the interior sealed space defined by the skirt wall 116 of the skirt valve portion 102, then into the second through passageway 16D of the lower lid portion 16, and finally, into the interior of the beverage cavity 28 above the liquid within the beverage cavity. Continued downward force applied by the user to the push button 128 will further compress the bellows 70 and force additional pressurized air through the air passageway and into the beverage cavity 28. The stiffness of the lower end portion 108 of the duckbill valve portion 100 determines how easy it is to open the duckbill valve portion and hence how much downward force must be applied by the user to the push button 128 to pump the bellows 70 up to the pressure needed to cause the two opposing sidewalls 110 and 112 at the lower end portion 108 of the duckbill valve portion to separate at the slit 114 and complete the air passageway to the beverage cavity 28.

As soon as the duckbill valve portion 100 is open and sufficient pressurized air enters the beverage cavity 28 as described above, the liquid within the beverage cavity 28 will begin to be forced upward through the straw channel 58 into the spout channel 50 and out of the outward end of the first channel portion 50A of the discharge outer end spout portion 44 for dispensing to a beverage container (not illustrated) positioned therebelow. This results in reduction of the air pressure within the bellows 70 and the closure of the slit 114 of the duckbill valve portion 100.

After liquid begins to flow from the spout 42, and before accomplishing a full depression of the push button 128, should the user decide to stop the flow of liquid out of the spout, the user simply needs to stop depressing the push button, but to prevent any residual pressure in the beverage cavity 28 above atmosphere from continuing to force more than the desired amount of liquid out of the spout, the user may remove the downward force being applied to the push button and allow the push button to move upward. As will be described below, this almost immediately vents the residual pressure out of the beverage cavity 28, thus eliminating the residual pressure that was pushing the liquid out of the spout 42 and avoiding the possibility of auto-pumping.

If a single depression of the push button 128 does not result in the desired amount of the liquid within the beverage cavity 28 being dispensed out through the spout 42, one or more additional depressions or downward strokes of the push button 128 will be required. To accomplish another depression of the push button 128, the user simply removes the downward force being applied to the push button, which results in the return spring 124 moving the lower bellows end wall 76 and the valve assembly 86 attached thereto upward, in the corrugated outer wall 70A of the bellows 70 acting as an integral spring moving the upper bellows end wall 74 upward, and in the bellows spring 78 moving the push button 128 upward, which causes the bellows to expand vertically upward from its collapsed state and return the upper bellows end wall 74 to its fully raised position, and the push button 128 to move upward at the same time. While the bellows 70 is expanding, air is being drawn into the bellows through the upper bellows end aperture 74A since the user is no longer applying the downward force on the push button 128 necessary to keep the button valve 134 closed. It is noted that in the illustrated embodiment while the bellows is expanding upward, the bellows spring 78 actively lifts the push button 128 to reduce the effective downward load on the upper bellows end wall 74 since the spring force of the corrugated outer wall 70A of the bellows 70 is not particularly high.

When the upper bellows end wall 74 reaches its fully raised position, the push button 128 is still not in its fully raised initial position. However, the bellows spring 78 will continue to move the push button 128 upward until the gap 135 between the seal 134A of the button valve 134 and the valve seat 74B again exists. The bellows spring 78 is sized such that when the upper bellows end wall 74 reaches its fully raised position, the upper spring end portion 78A extending through the upper bellows end aperture 74A will not have fully expanded and will continue to move the push button 128 upward to separate the button top wall 130 of the push button from the upper bellows end wall 74 sufficiently to again establish the gap 135. The beverage container 10 is then ready for the user to again depress the push button 128 for a full length stroke. It is noted that the user need not wait until the upper bellows end wall 74 reaches its fully raised position to again apply the needed downward force to the push button 128, but the result will be a lesser pressure being achieved for the trapped air in the bellows 70.

Whether after a full downward depression of the push button or at any point after the downward movement of the push button causes the pressurized air within the bellows 70 to open the duckbill valve portion 100 and flow into the beverage cavity 28, the user may remove the downward force being applied to the push button 128 and allow the push button to move slightly upward. The upward movement of the valve assembly 86 breaks the seal between the lower end portion 120 of the skirt wall 116 of the skirt valve portion 102 and annular valve seat portion 136 of the upper wall 16A of the lower lid portion 16, which results in any pressure above atmosphere remaining in the air space above the liquid within the beverage cavity 28 being exhausted to atmosphere via air passageways 138 within the lower lid portion. This immediately eliminates the air pressure forcing the discharge of the liquid and thereby stops the flow of the liquid out of the spout 42, and preventing any auto or self-pumping from occurring.

Figure 16:
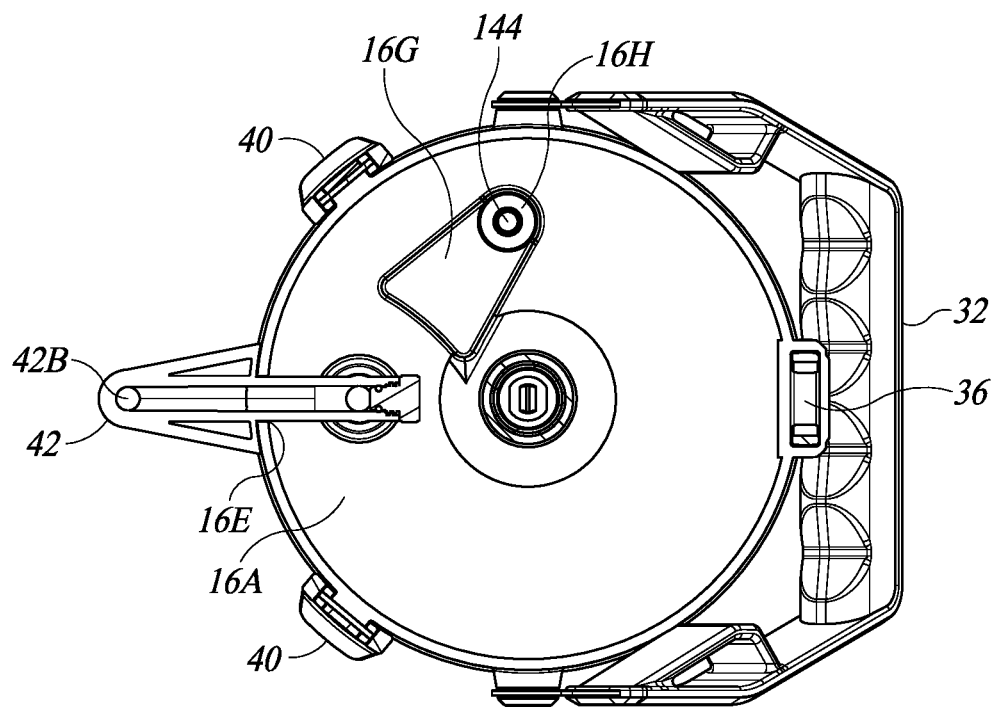
FIG. 16 is a top plan view of the airpot beverage dispenser of FIG. 1 with the lid removed and a spout in a dispensing position.

The dispenser 10 may be placed in its leak-proof locked state in which the liquid within the beverage cavity 28 will not be dispensed, and will not leak from the dispenser if the dispenser should not be in an upright position or if the dispenser is tilted or shaken while being transported. To change the dispenser 10 from the operating state to the locked state, the push button 128 is allowed to move to the raised position shown in FIGS. 1, 2, 4, 7 and 12, and when in the raised position, the two latches 40, which are latched when the lid 14 is in the closed position, are unlatched. After unlatching both of the two latches 40, the user may rotate the upper lid portion 18 about the hinge 36, to raise the upper lid portion sufficiently (preferably enough to place the lid 14 in the fully opened position shown in FIG. 15) to allow the user to move the spout 42 from the dispensing position shown in FIG. 16 to the stored position shown in FIG. 17.

When the dispenser 10 is in the operating state and the lid 14 is in the closed position, the middle spout portion 47 extends laterally through an upwardly open, perimeter wall recess 16E in a top perimeter wall portion 16F of the lower lid portion 16, and is captured therein by the chamber bottom wall 82 of the upper lid portion 18 positioned immediately thereabove. A lower side of the chamber bottom wall 82 has a downwardly extending protrusion 82D, which extends down to within a circular retainer wall 42A attached to and extending upwardly from the middle spout portion 47 to maintain the position of the spout in the perimeter wall recess 16E. The perimeter wall portion 16F projects upwardly beyond the upper wall 16A of the lower lid portion and terminates below the chamber bottom wall 82.

To move the spout 42 from the dispensing position to the stored position, with the lid 14 in the opened position or at least a partially opened position, the spout is pulled upward to move the middle spout portion 47 upward and out of the perimeter wall recess 16E. The spout 42 is then rotated clockwise (when view from above) until positioned above an upwardly opening, upper wall storage recess 16G in the upper wall 16A of the lower lid portion 16. The upper wall recess 16G is sized and shaped to receive the outward end portion of the middle spout portion 47 therein. An upwardly projecting plug 144 is positioned within a recess 16H within the upper wall recess 16G at a location corresponding to the location of the first channel portion 50A when the middle spout portion 47 is within the upper wall recess, such that when the middle spout portion is moved over the upper wall recess and push downward into the upper wall recess to place the spout 42 in the stored position, the plug 144 enters the first channel portion 50A and is in fluid tight sealing engagement with the outer end spout portion 44. This seals the first channel portion 50A against liquid passing out of the first channel portion while the spout 42 remains in the stored position.

It is noted that when pulling the spout 42 upward to move the middle spout portion 47 out of the perimeter wall recess 16E, the straw 56 moves upward with the spout and remains in fluid tight sealing engagement with the spout. In an alternative embodiment described below, the straw 56 may be maintained in its position and the spout 42 disconnected from fluid communication with the straw when the spout is pulled upward to move the middle spout portion 47 out of the perimeter wall recess 16E.

Figure 17:
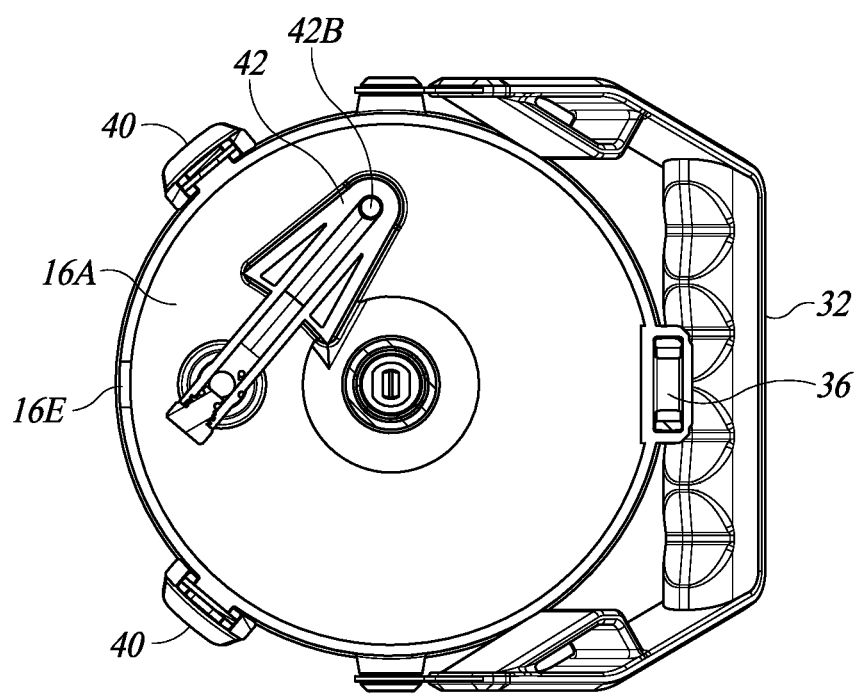
FIG. 17 is a top plan view of the airpot beverage dispenser of FIG. 1 with the lid removed and the spout in a stored position.

After the spout 42 is moved to the stored position shown in FIG. 17, the lid 14 is moved to the closed position by rotating the upper lid portion 18 downward, and then latching the upper lid portion to the lower lid portion 16 using the latches 40.

The push button 128 is next depressed and moved downward to the fully depressed position shown in FIG. 18. When in the fully depressed position, the push button 128 is rotated clockwise (when view from above) to a locked push button position. It is noted that an alternative sequence is to move the push button 128 downward to the fully downward position and then rotate the push button into the locked push button position while the lid is in the opened position before moving the lid 14 to the closed position, and thereafter move the upper lid portion 18 downward to the lid closed position and then latching it to the lower lid portion 16.

In the alternative embodiment mentioned above, the straw 56 may be maintained in its position and the spout 42 disconnected from fluid communication with the straw 56 when the spout is pulled upward to move the middle spout portion 47 out of the perimeter wall recess 16E. In this alternative approach, the upper straw end portion 54 carries an O-ring (not shown) which maintains a fluid tight sealing engagement with the spout 42 when in the dispensing position. When the spout 42 is pulled upward and rotated to move the spout to the stored position, the O-ring on the upper straw end portion 54 is disconnected from fluid tight sealing engagement with the spout, but the upper straw end portion remains within a downwardly opening recess (not shown) in the underside of the spout, and the seal 62 remains positioned between the inward end spout portion 46 and the inner wall of the first through passageway 16C of the lower lid portion 16 to provide a fluid-tight seal therebetween. As such, any liquid passing out of the upper straw end portion 54 while the spout 42 remains in the stored position flows into the downwardly open recess in the underside of the spout 42 and drains back down into the beverage cavity 28. This alternative embodiment eliminates the need for the plug 144 in the recess 16H to seal the first channel portion 50A of the spout 42 while in the stored position.

Figure 19:
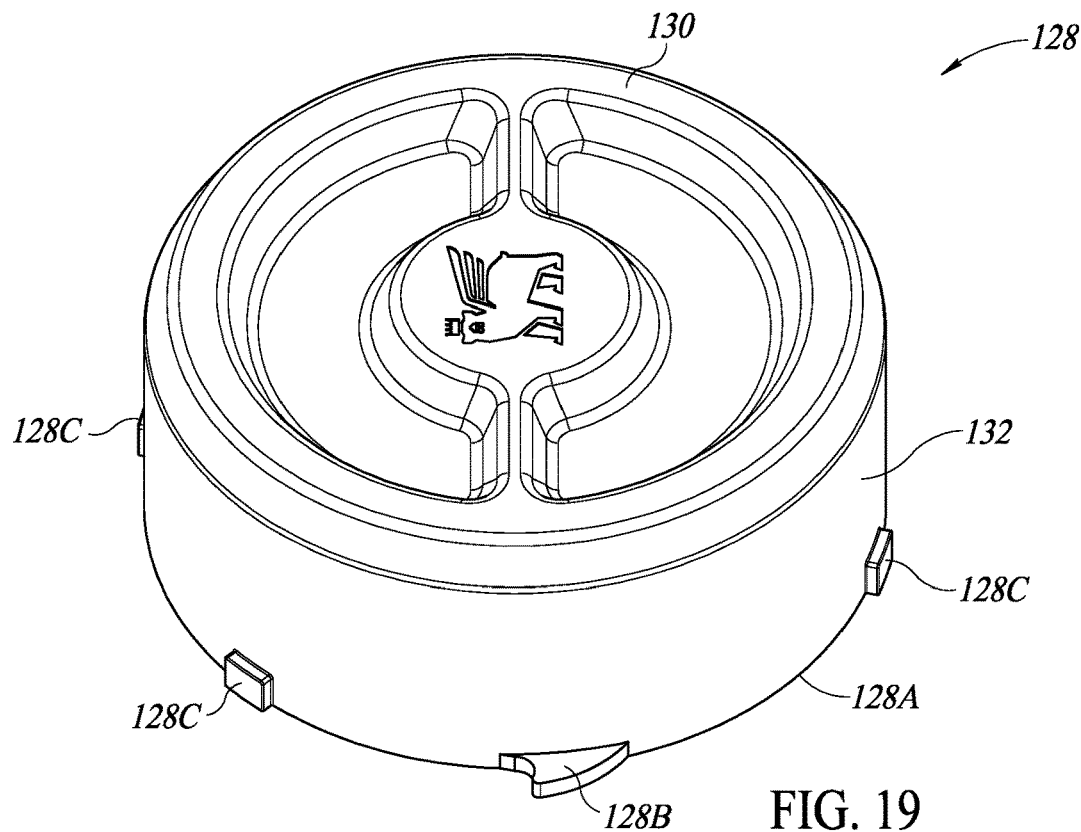
FIG. 19 is an enlarged, top perspective view of the push button of the airpot beverage dispenser of FIG. 1 shown removed from the dispenser.
Figure 20:
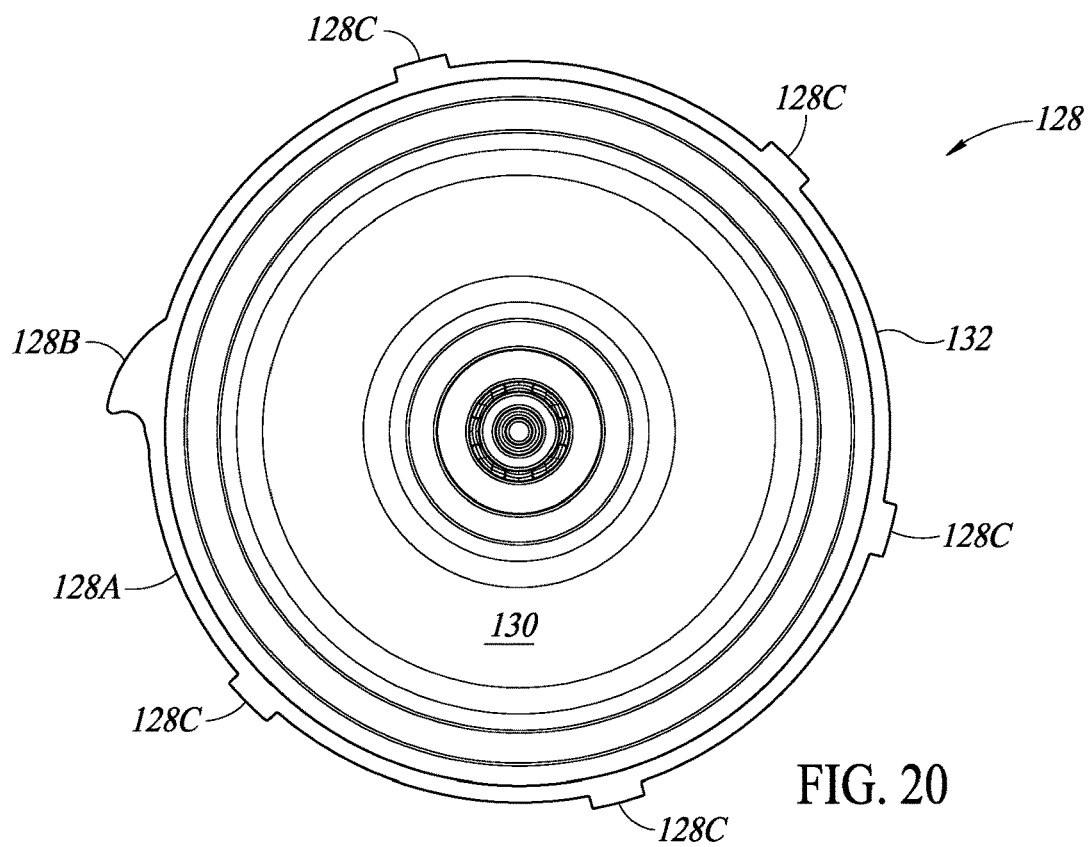
FIG. 20 is a bottom plan view of the push button of FIG. 19.
Figure 21:
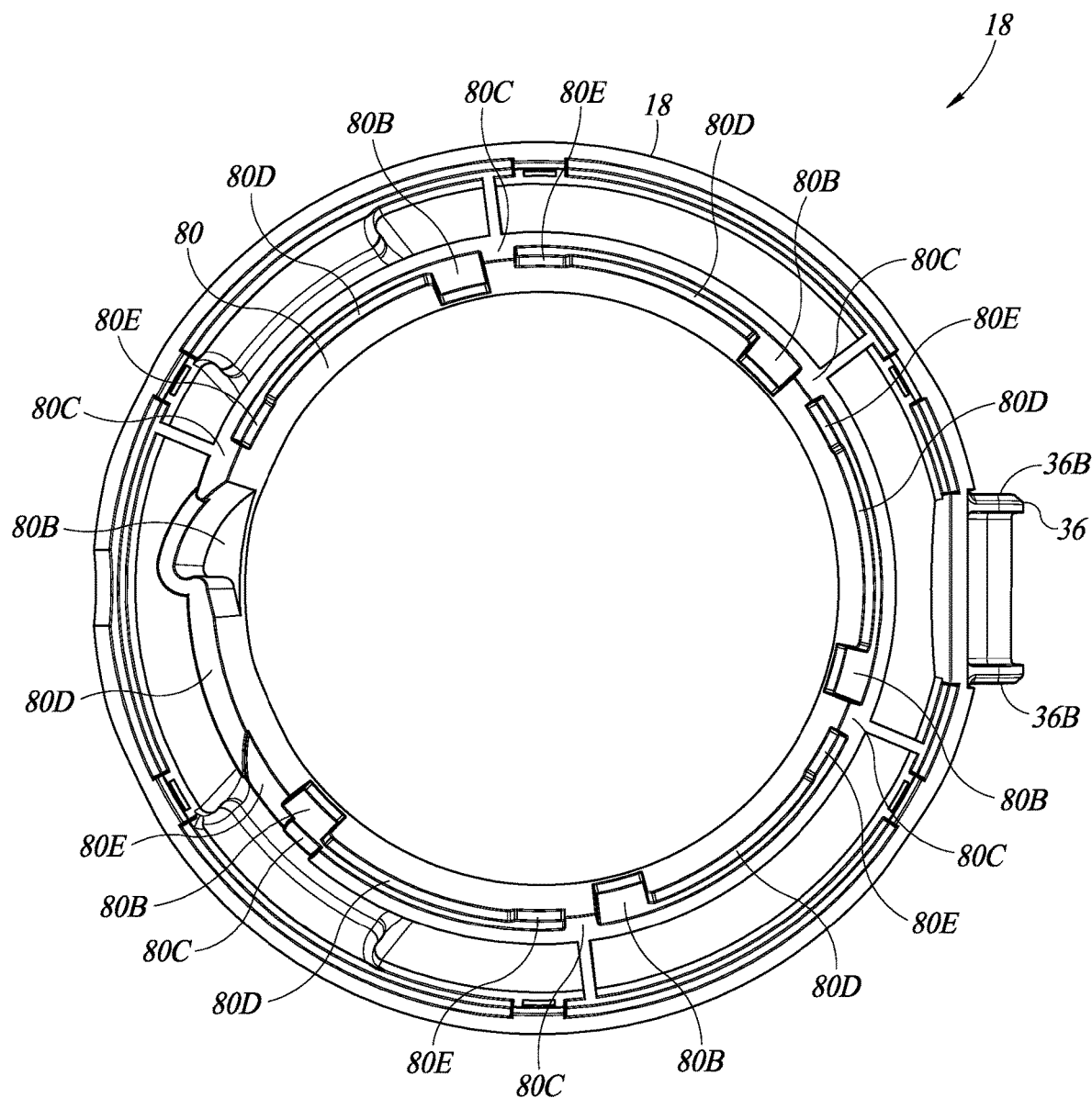
FIG. 21 is an enlarged, bottom plan view of an upper lid portion of the airpot beverage dispenser of FIG. 1 shown removed from the dispenser.

To guide the up and down reciprocal movement of the push button 128 within the chamber 72 and provide its proper alignment in the chamber, and also to hold the push button in the locked push button position when the push button is in its fully depressed position, the button sidewall lower end 128A has a outwardly extending arm 128B and five radially outward extending tabs 128C (best shown in FIGS. 19 and 20), and the chamber sidewall 80 has six vertically extending open channels or grooves 80B (best shown in FIG. 21), within which the arm and tabs may be movably disposed for upward and downward movement as the push button 128 moves upward and downward. One of the vertical grooves 80B is sized and shaped to receive the outwardly extending arm 128B and the other five grooves are sized and shaped to each receive one of the five tabs 128C. The outwardly extending arm 128B and the five tabs 128C are shown in FIG. 22 rotated into vertical alignment with the vertical grooves 80B for upward and downward movement within the vertical grooves.

Figure 22:
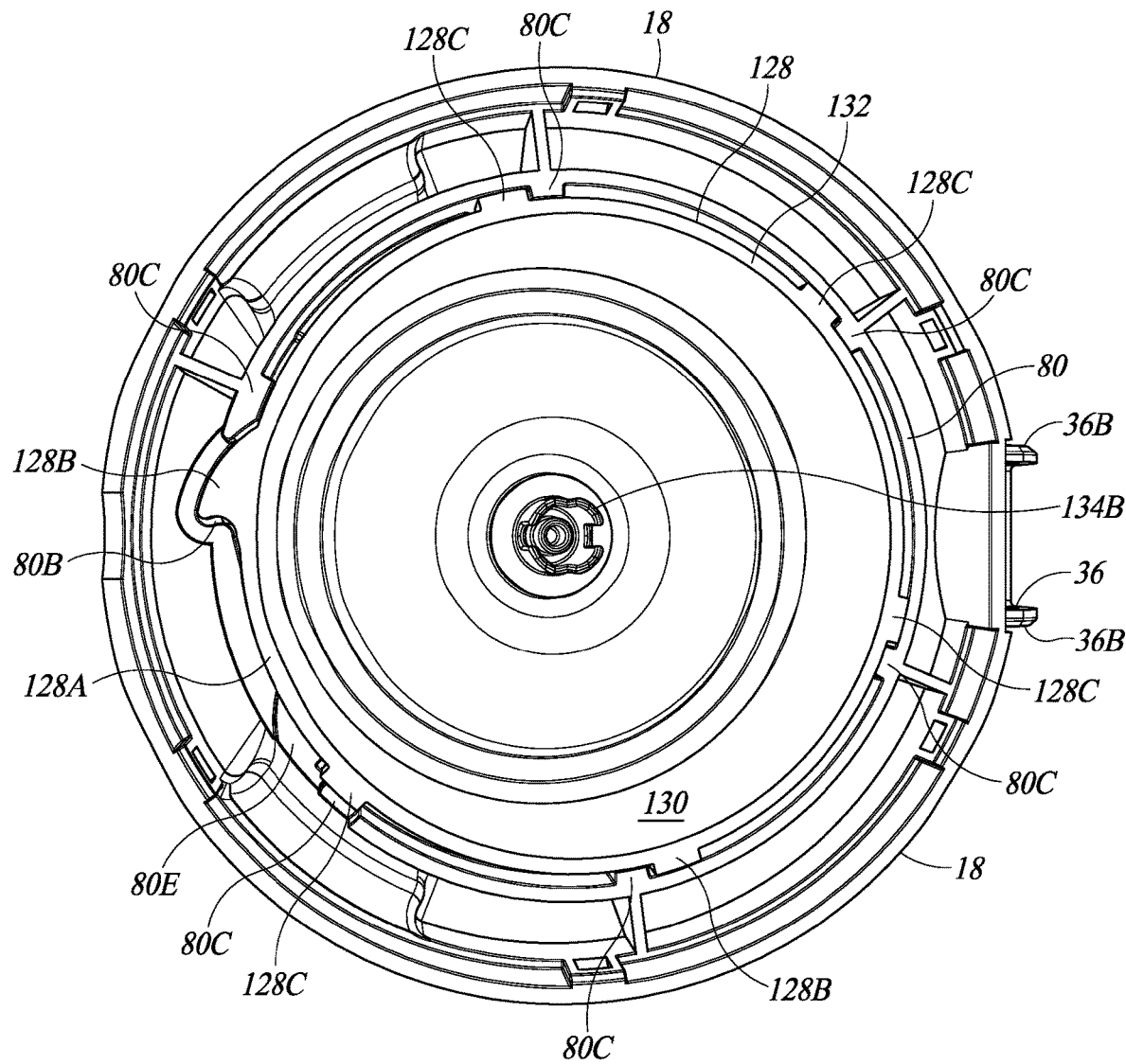
FIG. 22 is an enlarged, bottom plan view of an upper lid portion and lid push button of the airpot beverage dispenser of FIG. 1 shown removed from the dispenser with an arm and tabs of the lid push button rotated into vertical alignment with vertical channels of the upper lid portion for upward and downward movement within the vertical channels.
Figure 23:
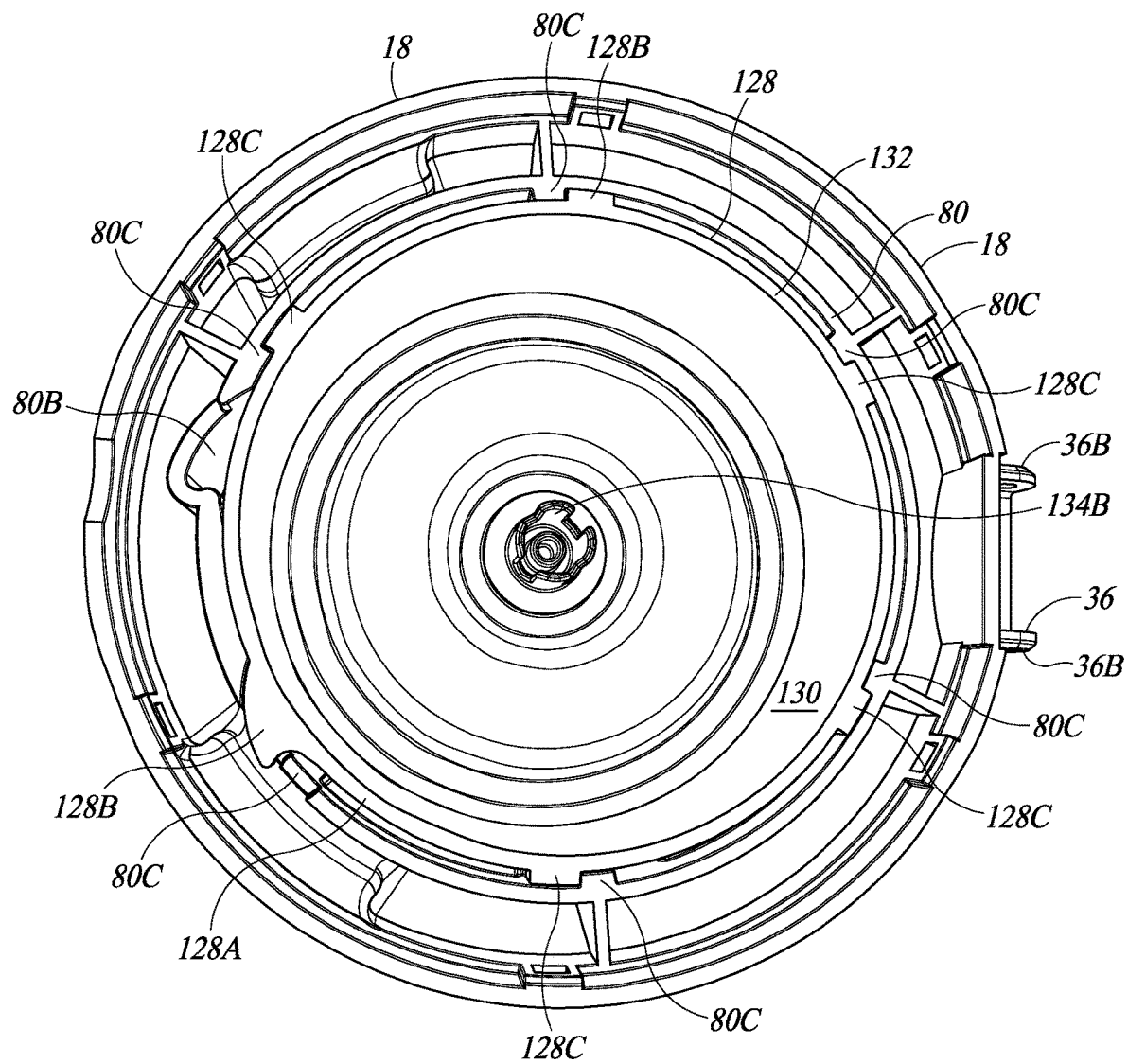
FIG. 23 is a bottom plan view of the upper lid portion and lid push button of FIG. 22 with an arm and tabs of the lid push button rotated away from vertical alignment with vertical channels of the upper lid portion to place the lid push button in a locked push button position.
Figure 26A:
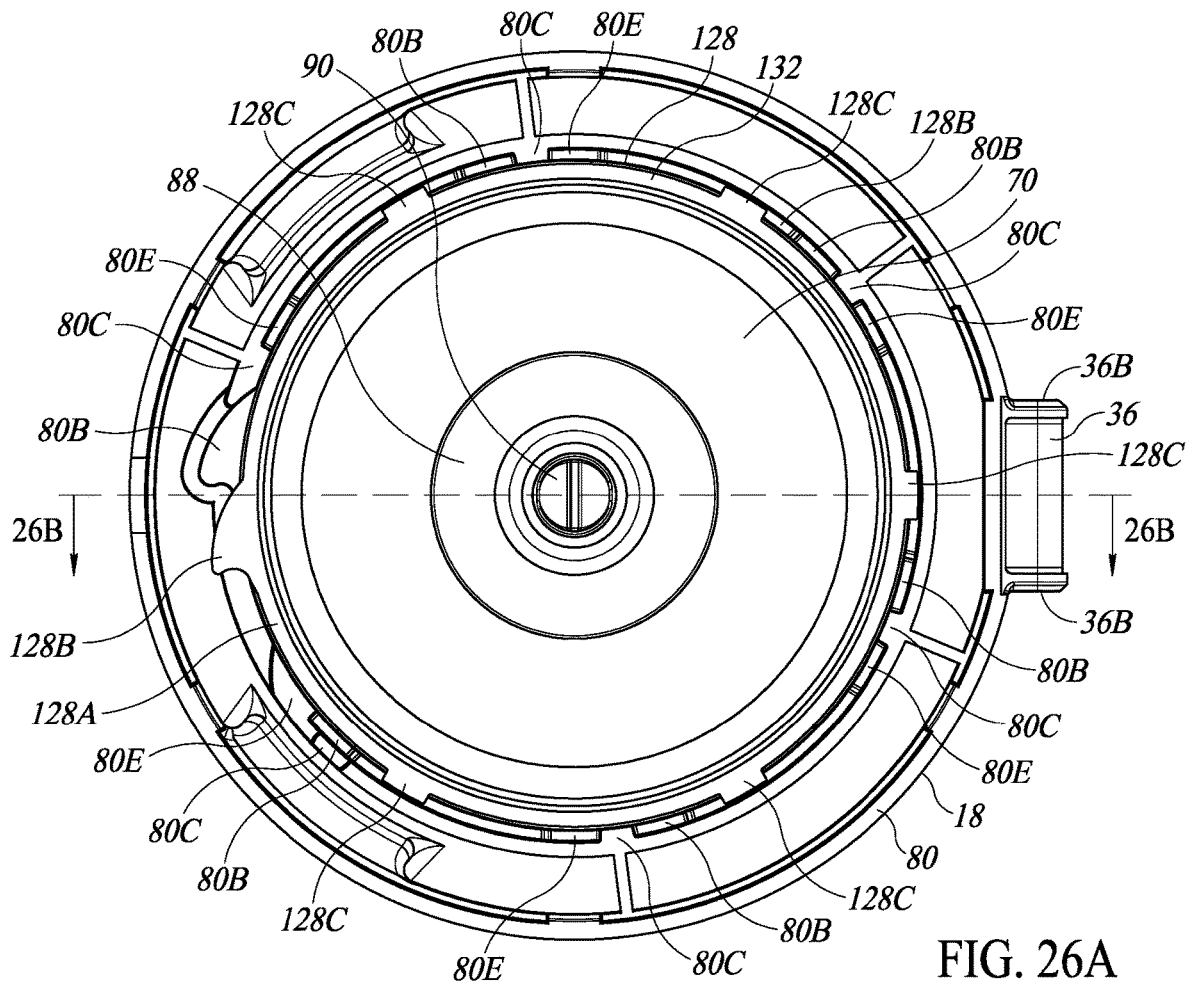
FIG. 26A is an enlarged, bottom plan view of the upper lid portion and lid push button of the dispenser of FIG. 1 with the lid push button rotated partially toward the locked push button position.
Figure 26B:
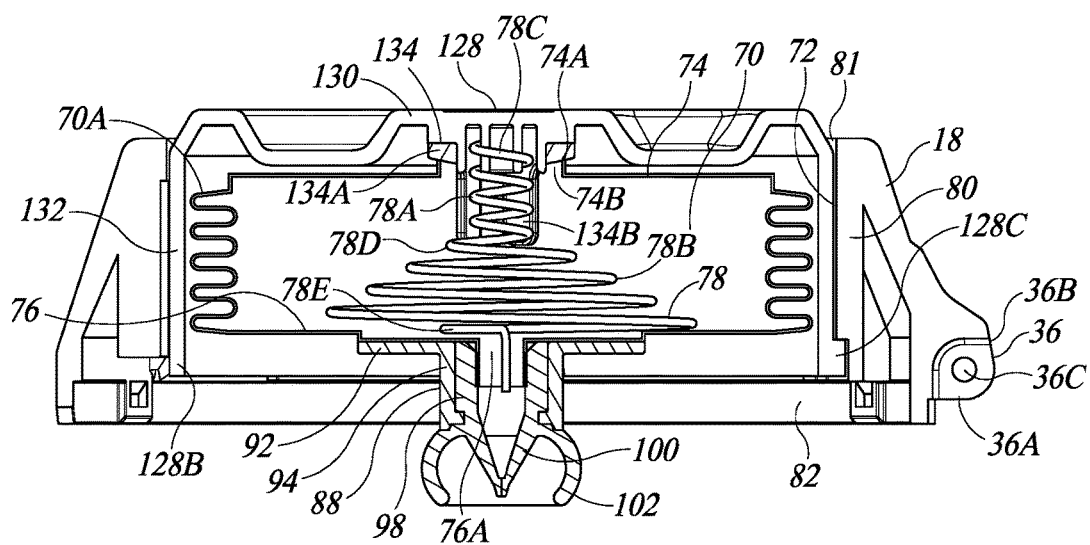
FIG. 26B is a left side cross-sectional view of the upper lid portion and lid push button of the dispenser of FIG. 26A.
Figure 27A:
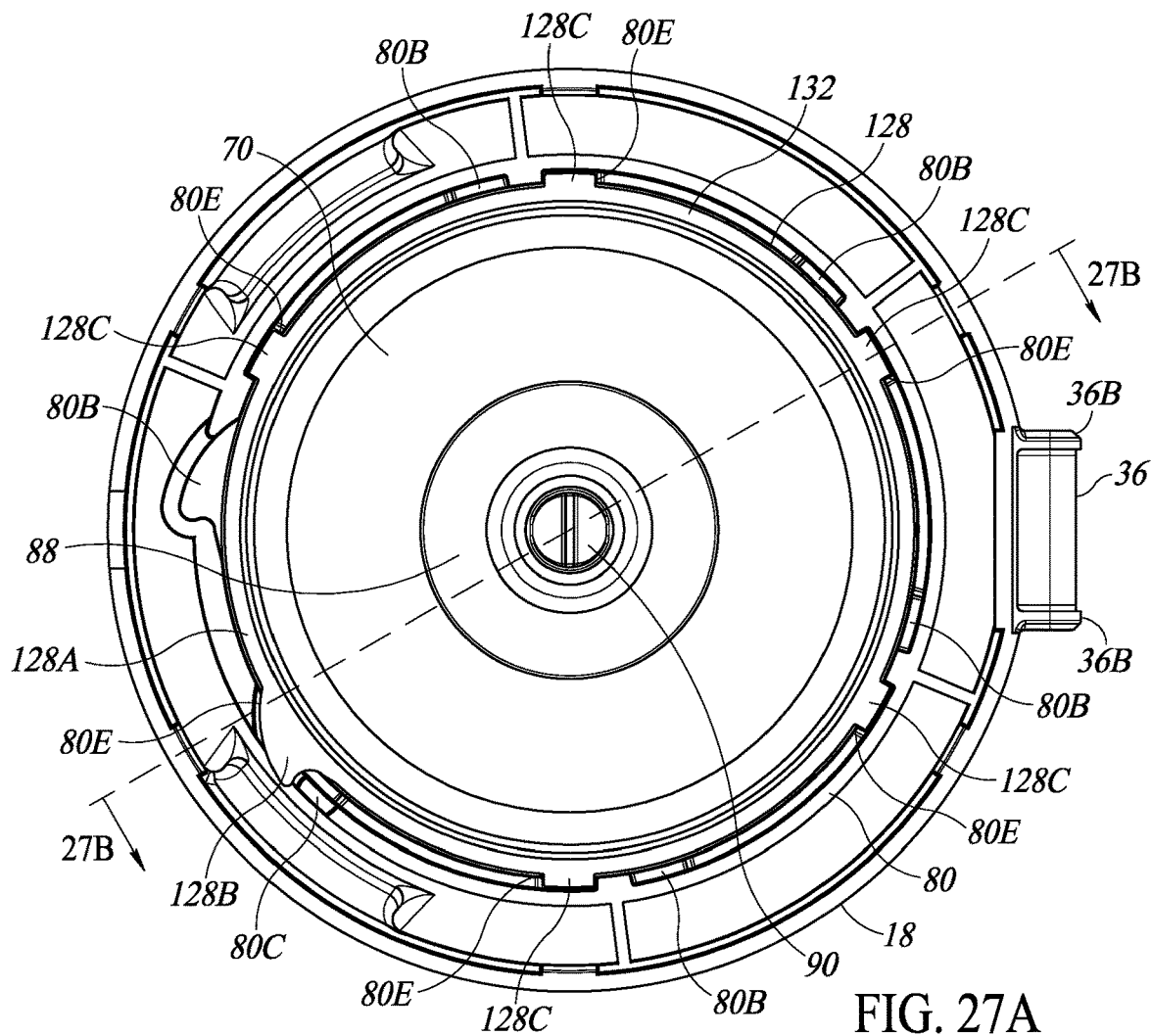
FIG. 27A is an enlarged, bottom plan view of the upper lid portion and lid push button of the dispenser of FIG. 1 with the lid push button rotated fully to the locked push button position.
Figure 27B:
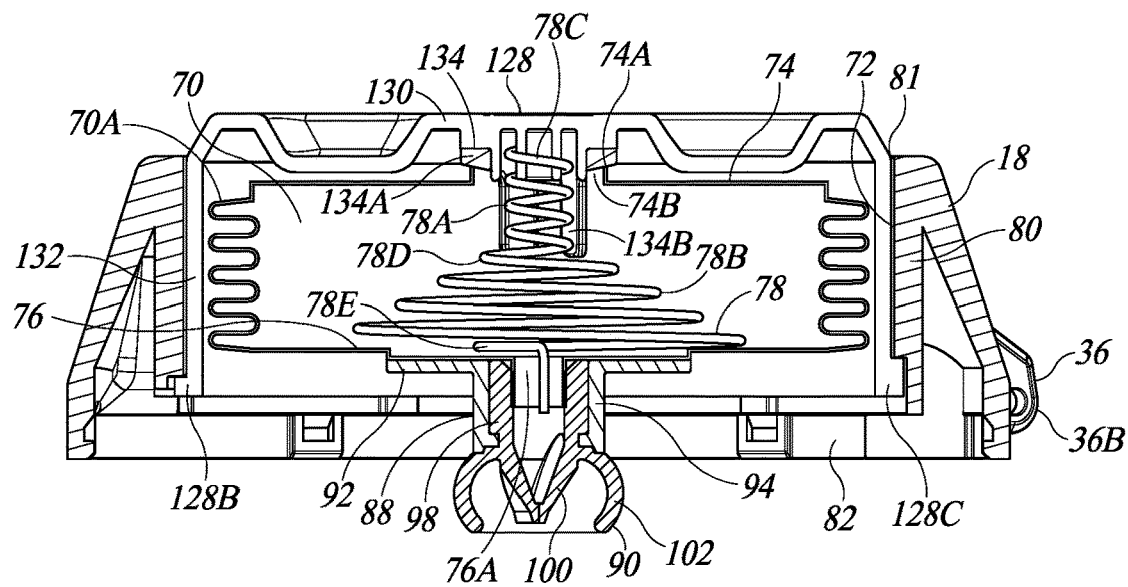
FIG. 27B is a left side cross-sectional view of the upper lid portion and lid push button of the dispenser of FIG. 27A.

When the push button 128 is moved downward into its it fully depressed position, the push button may be rotated clockwise when view from above (counterclockwise when viewed from below as in FIGS. 22 and 23) from the position shown in FIG. 22 with the outwardly extending arm 128B and the five tabs 128C in vertical alignment with the vertical grooves 80B, until each is rotated into engagement with one of six elongated, vertically extending stops 80C, as shown in FIG. 23 (see also FIG. 27A), whereat the push button is in the locked push button position. FIG. 26A shows the position of the outwardly extending arm 128B and the five tabs 128C rotated to mid-way between the vertical grooves 80B and the stops 80C. To permit this rotation of the outwardly extending arm 128B and the five tabs 128C between the vertical grooves 80B and the stops 80C, the lower end portion of the chamber sidewall 80 has six horizontal open channels or grooves 80D (see FIG. 21) extending around the inward perimeter of the chamber sidewall, each permitting one of the outwardly extending arm 128B and the five tabs 128C to be rotated between the one of the vertical grooves 80B and one of the stops 80C, while preventing upward movement of the outwardly extending arm and the tabs during that rotation. However, to hold the push button 128 securely in the locked push button position and prevent unintended rotational movement of the outwardly extending arm 128B and the five tabs 128C back toward the vertical grooves 80B, an upwardly extending lock recess 80E is provided adjacent to each stop 80C sized to receive the one of the outwardly extending arm or tab in engagement with the stop. When the push button 128 is released by the user after the push button has been rotated into the locked push button position, there is a slight upward movement of the push button provided by the bellows spring 78 that moves the arm 128B and the five tabs 128C upward into its corresponding lock recess 80E. In addition to holding the push button 128 in the locked push button position, it secures the dispenser 10 in the locked state and the bellows 70 in its collapsed state.

It is noted that when the dispenser 10 is in the locked position, any downward movement of the push button 128, including the movement just described, will not cause additional air to enter the bellows 70 and hence not pump out any liquid in the beverage cavity 28, since the bellows is sealed on both ends by the seal 134A of the button valve 134 at the upper end and by the duckbill valve portion 100 of the valve 90 at the lower end. If the push button 128 were pumped when in the locked push button position, it would just slightly deform the bellows, but not moving any air through the bellows to the beverage cavity 28.

When the user desires to change the dispenser 10 from the locked state back to the operating state, the user sufficiently depresses the push button 128 downward to move the outwardly extending arm 128B and the five tabs 128C downward and out of the lock recesses 80E and into the horizontal grooves 80D, and rotates the push button counterclockwise when view from above (clockwise when viewed from below as in FIGS. 22 and 23) until the arm and the tabs are again each in vertical alignment with one of the vertical grooves 80B. The user then need only release the push button 128 to remove any downward being applied to the push button, and allow the push button and the bellows end wall 74 to rise upward under the force applied by the bellows spring 78 to their fully raised positions. Each of the stops 80C is located adjacent to one of the vertical grooves 80B, such that when the push button 128 is being rotated from the locked push button to the position with the outwardly extending arm 128B and the five tabs 128C in vertical alignment with the vertical grooves 80B, the stops will prevent further rotation of the arm and the tabs beyond their position in vertical alignment with the vertical grooves. The latches 40 are then unlatched, the upper lid portion 18 is rotated upward sufficient to allow the user to move the spout from its stored position in the upper wall recess 16G back to its dispensing position, and then the upper lid portion is closed and latched back to the lower lid portion 16. This places the dispenser 10 back into the operating state.

Figure 28:
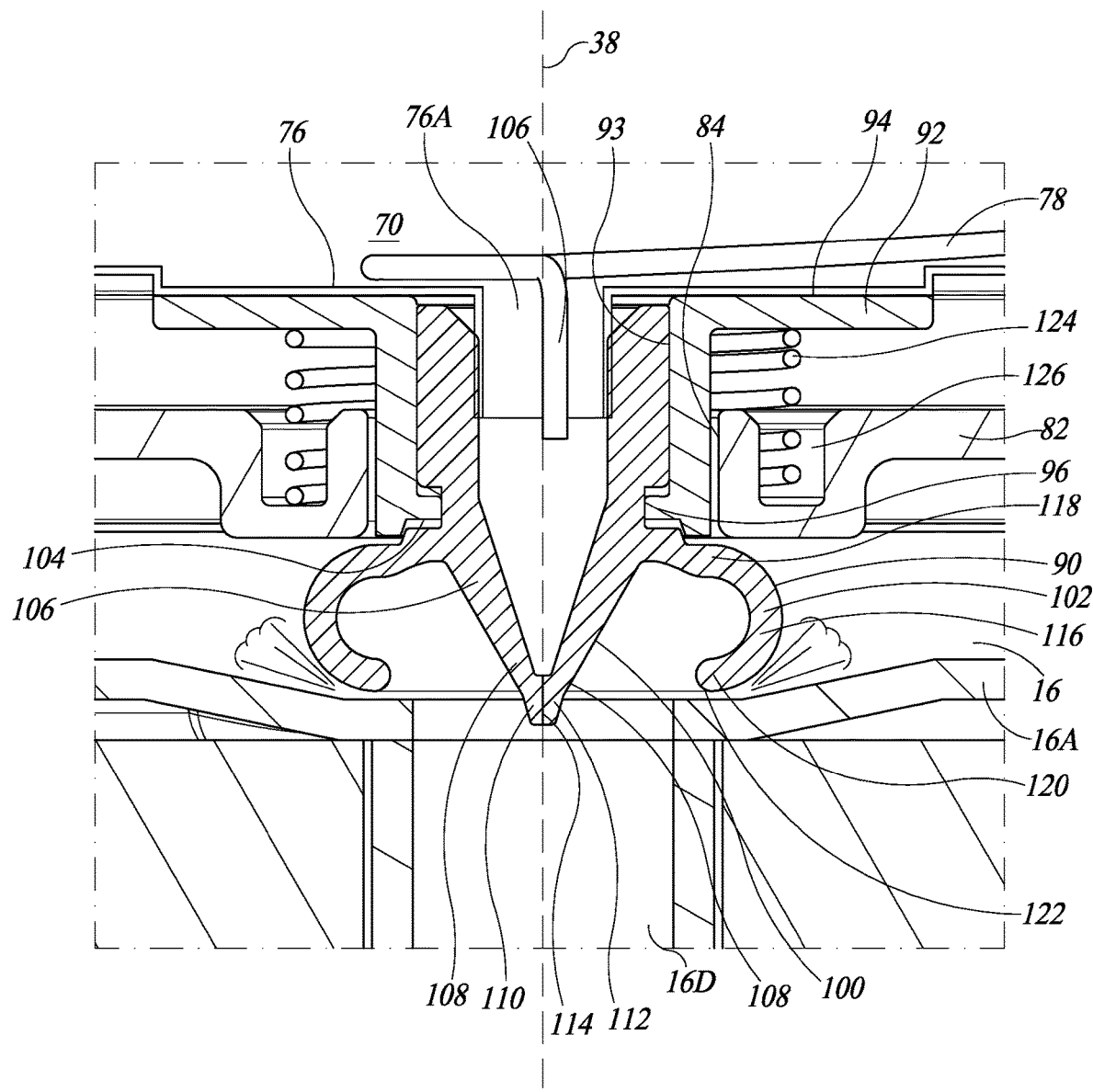
FIG. 28 is an enlarged, fragmentary, left side cross-sectional view of the airpot beverage dispenser as illustrated in FIG. 14, but with the lid push button rotated fully to the locked push button position and illustrating a skirt wall of the valve of FIG. 11B relieving excess pressure within a beverage cavity of the dispenser.
Figure 29:
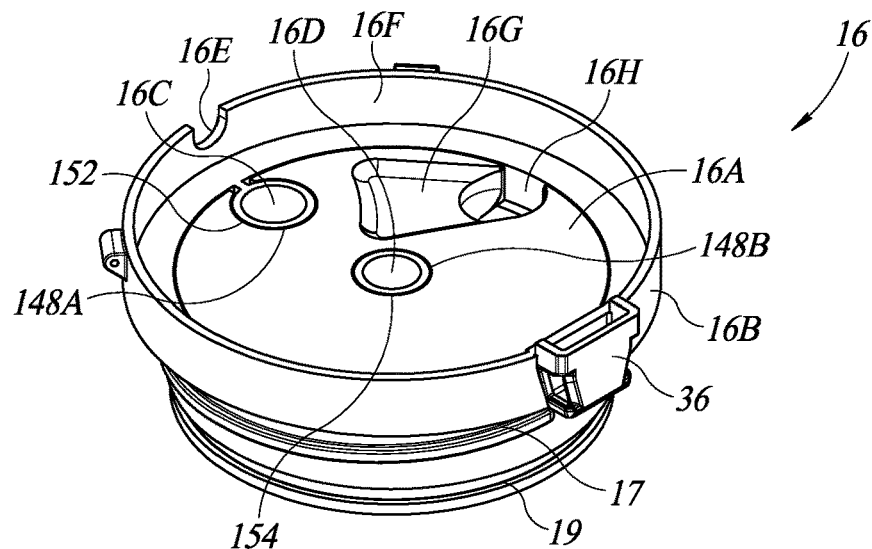
FIG. 29 is an enlarged, top perspective view of a lower lid portion of the airpot beverage dispenser of FIG. 1 shown removed from the dispenser.
Figure 30:
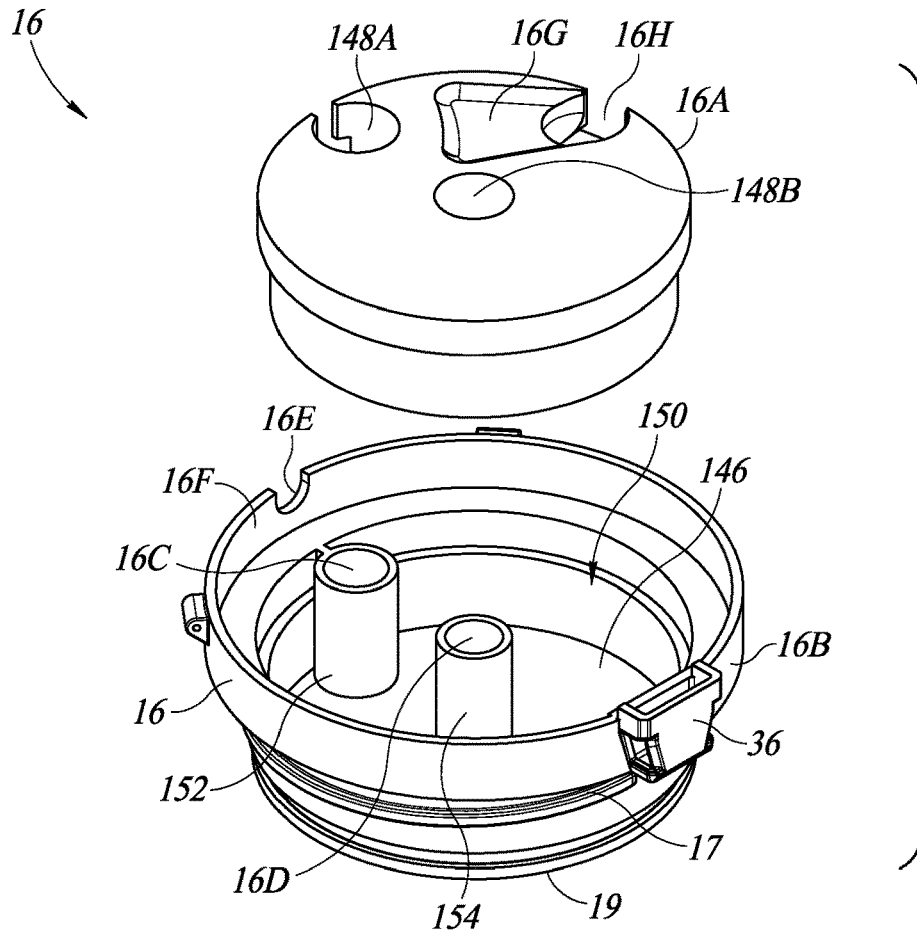
FIG. 30 is an exploded view of the lower lid portion of FIG. 29 showing an upper wall and a lower lid compartment of the lower lid portion.
Figure 31:
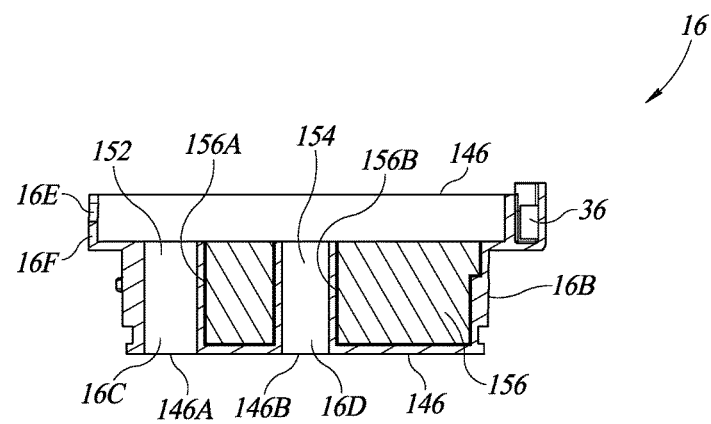
FIG. 31 is a left side cross-sectional view of the lower lid compartment of FIG. 30 with an insulation block installed therein.
Figure 32:
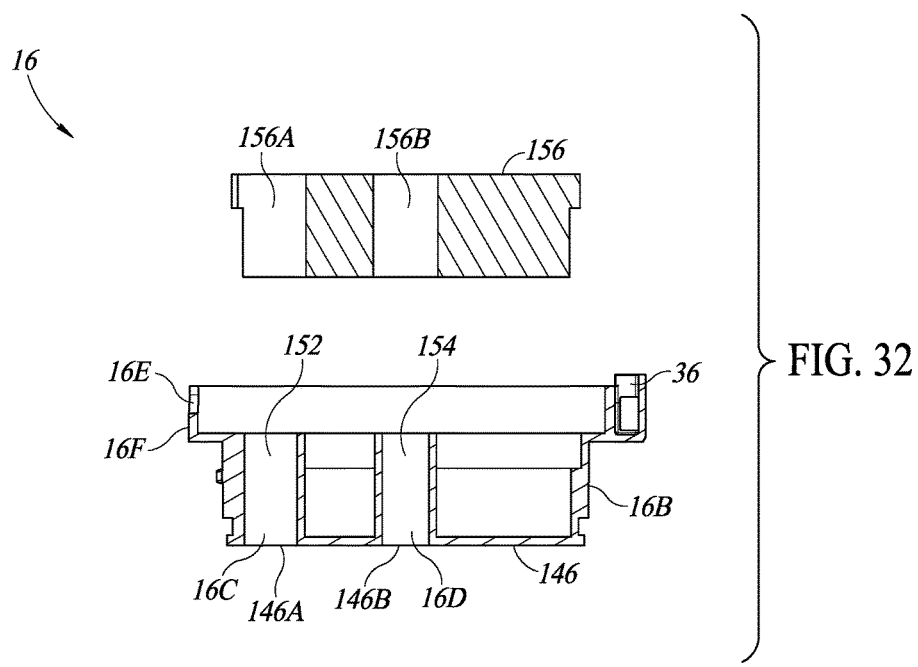
FIG. 32 is an exploded view of the lower lid compartment and insulation block of FIG. 31.

When the spout 42 is in the stored position and the push button 128 is rotated into the locked push button position, the push button will have been sufficiently depressed to move the lower end portion 120 of the skirt wall 116 of the skirt valve portion 102 into fluid tight sealing engagement with the annular valve seat portion 136 of the upper wall 16A of the lower lid portion 16 (and the duckbill valve portion 100 will be closed). In this situation, the skirt valve portion 102 is designed to serve as a pressure relief valve and release a portion of the pressure within the beverage cavity 28 if that pressure increases, such as through fermentation over time of the liquid remaining in the beverage cavity, to a level approaching an internal pressure which might cause damage to the dispenser. In operation, when the pressure within the beverage cavity 28 reaches a release pressure, the pressure within the beverage cavity 28 will cause at least a momentary separation between at least a portion of the skirt wall 116 and the annular valve seat portion 136 through which the excess pressure is relieved (i.e., the skirt wall will "burp" gas as shown in FIG. 28), and then the skirt wall 116 will once again come fully into fluid tight sealing engagement with the annular valve seat portion 136. The release pressure at which the skirt valve portion 102 releases the excess pressure depends on the flexibility of the material selected for skirt wall 116 and the shape of the skirt wall, which can be selected to provide a desired pressure at which the skirt valve portion will prevent being exceeded.

Figure 24:
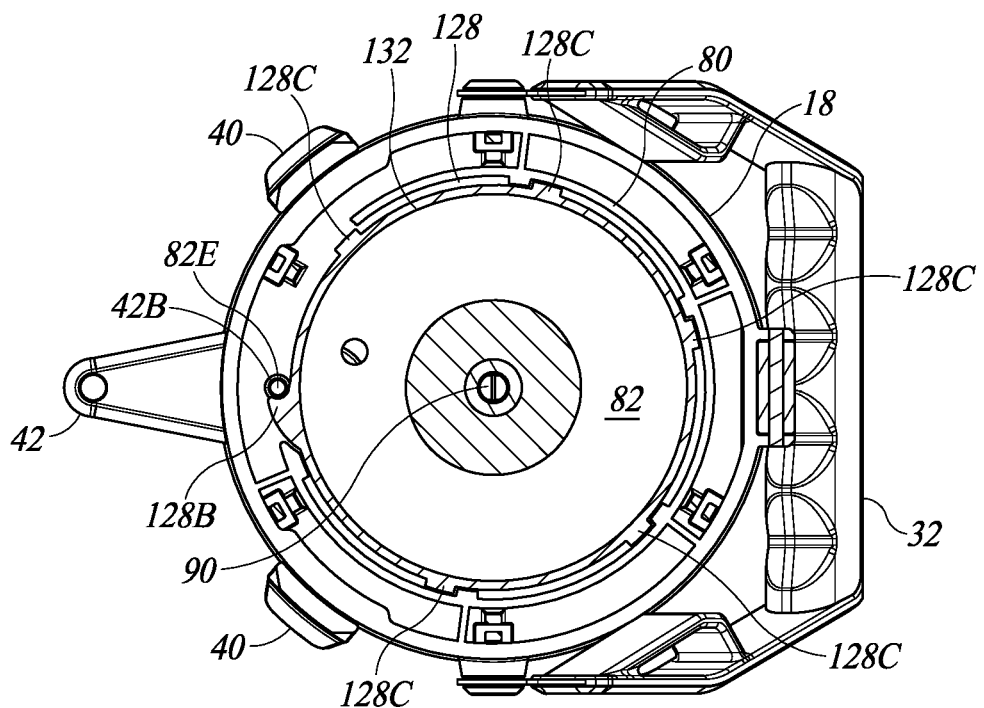
FIG. 24 is a top plan, cross-sectional view of the airpot beverage dispenser of FIG. 1, shown taken substantially along the line 24-24 of FIG. 4, with the spout in the dispensing position and the lid push button prevented from rotation to the locked push button position.
Figure 25:
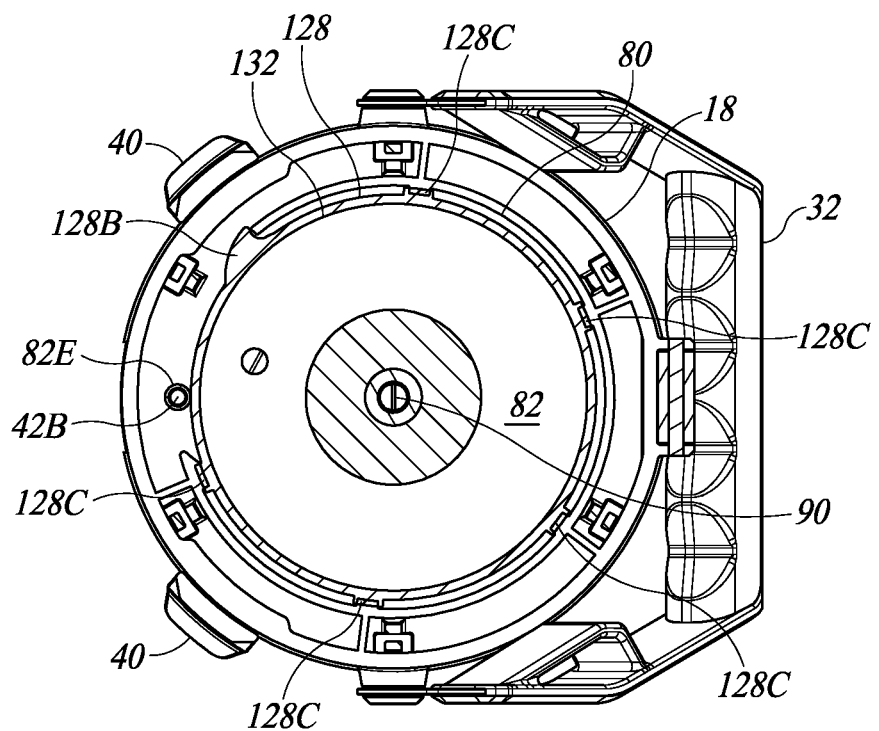
FIG. 25 is a top plan, cross-sectional view of the airpot beverage dispenser of FIG. 1, shown taken substantially along the line 25-25 of FIG. 4, with the spout removed and the lid push button rotated to the locked push button position.

It is noted that if the lid 14 is in the closed position, with the push button 128 in the raised position, and the spout 42 is in the dispensing position, when the push button is moved into the fully depressed position it cannot then be rotated into the locked push button position. This is because clockwise rotation of the push button 128 will cause the arm 128B at the button sidewall lower end 128A to engage a stop member 42B attached to and extending upwardly from the middle spout portion 47, which limits clockwise rotational movement of the push button when the spout 42 is in the dispensing position (see FIGS. 24 and 25). The stop member 42B extends upward from the spout through an aperture 82E in the chamber bottom wall 82 with its upper end positioned in the path of rotational movement of the arm 128B. Rotational movement of the arm 128B resulting from rotation of the push button 128 toward the locked push button position is not prevented when the spout 42 has been moved to the stored position, sitting in the upper wall recess 16G. This is because when in the upper wall recess 16G, the spout 42 and the top of the stop member 42B are positioned sufficiently below the vertical position of the arm 128B that the arm 128B will pass over them and be unimpeded by the stop member as the push button 128 is rotated into, or out of, the locked push button position. It is noted that if the push button 128 could be placed in the locked push button position without moving the spout 42 to the stored position, and hence the spout remained in the dispensing position, sufficient agitation of the liquid in the beverage cavity 28 might result in self-pumping of the liquid out of the spout.

It is further noted that the upper end of the stop member 42B is positioned immediately below a lower end 80F of the chamber sidewall 80 such that when the dispenser 10 is in the operating state and the lid 14 is in the closed position, and the middle spout portion 47 extends laterally through the perimeter wall recess 16E in a top perimeter wall portion 16F of the lower lid portion 16, the middle spout portion is captured therein by the lower end of the chamber sidewall being 82D positioned immediately thereabove.

As described above, the removable plug 68 is provided to aid in cleaning the third channel portion 50C of the spout channel 50 of the spout 42. Additionally, the spout 42 is removable from the first through passageway 16C of the lower lid portion 16 and the straw 56 may be disconnected from the inward end spout portion 46 to facilitate cleaning of the spout and straw.

As shown in FIGS. 7-9 and as described above, the lower lid portion 16 includes the upper wall 16A and the lower lid compartment 16B positioned below the upper wall 16A. The upper wall 16A is in fluid tight sealing engagement with the lower lid compartment 16B positioned therebelow to define a dry internal, lower lid portion chamber 150 therebetween. A lower wall 146 of the lower lid compartment 16B has two apertures 146A and 146B, and the upper wall 16A has two apertures 148A and 148B. As shown in FIGS. 29-32, a first conduit 152 is vertically positioned within the lower lid portion chamber 150 and defines the first through passageway 16C of the lower lid portion 16, and has upper and lower open ends. The lower end of the first conduit 152 is in alignment with the aperture 146A of the lower wall 146 and in fluid tight sealing engagement with the lower wall, and the upper end of the first conduit is in alignment with the aperture 148A of the upper wall 16A and in fluid tight sealing engagement with the upper wall. Similarly, a second conduit 154 is vertically positioned within the lower lid portion chamber 150 and defines the second through passageway 16D of the lower lid portion 16, and has upper and lower open ends. The lower end of the second conduit 154 is in alignment with the aperture 146B of the lower wall 146 and in fluid tight sealing engagement with the lower wall 146, and the upper end of the second conduit is in alignment with the aperture 148B of the upper wall 16A and in fluid tight sealing engagement with the upper wall.

A Styrofoam insulation puck or block 156 is positioned within the lower lid portion chamber 150, with a vertically oriented, first block through passageway 156A through which the first conduit 152 fully extends and a vertically oriented, second block through passageways 156B through which the second conduit 154 fully extends. The first and second block passageways 156A and 156B are cylindrical in shape and have a cross-sectional size to receive the first and second conduits 152 and 154, respectively, snuggly therein with their sidewalls in engagement with the block 15. The outer perimeter of the block 15 is sized to fit snuggly within the lower lid portion chamber 150 with the outer sidewall of the block in engagement with the inner sidewall of the lower lid compartment 16B. The block 15 is positioned within the lower lid portion chamber 150 before the upper wall 16A and the lower lid compartment 16B are sealed together. The insulation block 156 provides the lower lid portion 16 of the lid 14 with improved thermal properties. Other insulating material may be used other than air.

The first conduit 152 receives the inward end spout portion 46, the seal 62 and the upper end straw portion 54 therein, and the second conduit 154 is an air passageway to the beverage cavity 28 through which the pressurized air produced by the compression of the bellows 70 passes.

As best seen if FIG. 1, the bail handle 32 includes a first handle support portion 158 and a second handle support portion 160, and a grippable handle portion 162. A first end portion 158A of the first handle support portion 158 is rotatably attached to the collar 34, which is attached to the upper end portion 20 of the container body 12, and a first end portion 160A of the second handle support portion 160 is rotatably attached to the collar, on a side of the container body opposite the attachment of the first handle support portion. A second end portion 158B of the first handle support portion 158 is fixedly attached to one end of the grippable handle portion 162, and a second end portion 160B of the second handle support portion 160 is fixedly attached to the opposite end of the grippable handle portion.

A third handle portions 158C of the first handle support portion 158, located between the first and second end portions 158A and 158B, has an inward portion 164 and an outward portion 166 defining a pass-through attachment opening 168 therebetween, which is fully encircled by the inward and outward portions 164 and 166. A third handle portions 160C of the second handle support portion 160, located between the first and second end portions 160A and 160B, has an inward portion 170 and an outward portion 172 defining a pass-through attachment opening 174 therebetween, which is fully encircled by the inward and outward portions 170 and 172. The attachment openings 168 and 174 each have a transverse are each sized to permit a rope, clip or other attachment member to extend therethrough to facilitate securing the dispenser 10 to a support, such as a fence, car, boat or other vehicle, to support the weight of the dispenser and the liquid in the internal container cavity 28, or to facilitate securing an item to the dispenser, such as a package of drink additive, a spoon or a sugar container. While shown with two attachment openings 168 and 174, it is to be understood that alternatively the dispenser 10 may have only a single attachment opening.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An airpot beverage dispenser for dispensing a beverage, comprising:

a container body with a body upper end portion and a beverage cavity for holding the beverage;

a lid attachable to the body upper end portion, the lid including:
- a lower lid portion in fluid tight sealing engagement with the body upper end portion, and having a lower lid upper wall with first and second apertures; and
- an upper lid portion having an upwardly open upper lid portion chamber with a chamber sidewall and a chamber bottom wall having a chamber bottom wall aperture;

a spout including:
- a spout head portion having an outward end portion with an opening for dispensing the beverage contained in the beverage cavity, and an inward end portion; and
- a spout conduit having an upper end portion in fluid communication with the inward end portion of the spout head portion and a lower end portion positioned within the beverage cavity, at least one of the inward end portion of the spout head portion and an upper end portion of a spout feed conduit extending through the first aperture of the lower lid upper wall and being in fluid tight sealing engagement with the lower lid portion;

a bellows positioned at least partially within the upper lid portion chamber, the bellows having an upper bellows end wall with an upper bellows aperture, and a lower bellows end wall with a lower bellows aperture;

a bellows spring having an upper spring end portion and a lower spring end portion, the lower spring portion being positioned within the bellows and having a lower end in engagement with the lower bellows end wall, and the upper spring end portion extending through the upper bellows aperture and having an upper end positioned above the upper bellows end wall;

a manually operable actuator positioned at least partially within the upper lid portion chamber for reciprocal movement therein, the actuator having a top wall portion positioned above the upper bellows end wall and a sidewall extending downward from the top wall and into the upper lid portion chamber, the top wall being in engagement with the upper end of the upper spring end portion, the actuator being downwardly movable between an upper first position, a second position below the upper first position, a third position below the second position, and a fourth position below the third position, the top wall portion of the actuator being in engagement with the upper bellows end wall during downward movement of the actuator between the second position and the fourth position and applying a downward force on the upper bellows end wall to progressively collapse the bellows;

an upper valve including an upper seal and an upper seat, the upper seal being positioned to close the upper bellows aperture when the actuator is moved downward from the first position to the second position whereat the upper seal is in fluid tight sealing engagement with the upper seat and prevents air in the bellows from escaping out the upper bellows aperture, thereby trapping air in the bellows, one of the upper seal and the upper seat being attached to the actuator and the other being attached to the upper bellows end wall; and a valve assembly supported by the lower bellows end wall for upward and downward movement therewith, the valve assembly including:
- a skirt valve portion having a skirt wall with an upper end skirt wall portion and a flexible lower end skirt wall portion, the lower end skirt wall portion defining a skirt wall aperture, when the actuator is moved downward to the third position, the lower end skirt wall portion is positioned in fluid tight sealing engagement with the lower lid upper wall and extends fully about the second aperture of the lower lid upper wall, downward movement of the actuator from the second position to the third position at least partially collapsing the bellows and thereby increasing the pressure of the trapped air in the bellows; and
- a duckbill valve portion having an upper duckbill valve portion and a lower duckbill valve portion, the upper duckbill valve portion being in fluid communication with the lower bellows aperture, the upper end skirt wall portion being in fluid tight sealing engagement with the upper duckbill valve portion and the lower end skirt wall portion extending fully about the lower duckbill valve portion, the lower duckbill valve portion having first and second sidewalls with a normally closed slit extending between the first and second sidewalls, downward movement of the actuator from the third position to the fourth position further collapses the bellows and thereby further increases the pressure of the trapped air in the bellows, when the actuator is in the fourth position, the pressure of the trapped air is sufficient to separate the first and second sidewalls and thereby open the slit and provide a fluid passageway for the trapped air in the bellows to the beverage cavity through the second aperture of the lower lid upper wall, thereby the duckbill valve portion serves as a one-way valve only permitting outward flow of the pressurized trapped air in the bellows to pass from the lower bellows aperture through the chamber bottom wall aperture into the beverage cavity through the second aperture of the lower lid upper wall, the pressurized trapped air provided to the beverage cavity being sufficient to force a portion of the beverage in the beverage cavity into the spout conduit and upward into the spout head and to be dispensed out of the opening of the outward end portion of the spout head.

2. The beverage dispenser of claim 1, wherein when a sufficient amount of the pressurized trapped air in the bellows passes out through the lower bellows aperture, the pressure of the remaining air with the bellows will be reduced and the slit of the lower duckbill valve portion will close.

3. The beverage dispenser of claim 1, further including a return spring positioned between the lower bellows end wall and the chamber bottom wall, when the actuator is in the fourth position and the downward force on the actuator is sufficiently reduced, the return spring moves valve assembly upward sufficient to disengage the lower end skirt wall portion from fluid tight sealing engagement with the lower lid upper wall, thereby permitting any residual pressurized air within the beverage cavity to escape out the second aperture of the lower lid upper wall.

4. The beverage dispenser of claim 1, wherein when the actuator is in the fourth position and the downward force on the actuator is sufficiently reduced, the lower end skirt wall portion is moveable upward sufficient to disengage the lower end skirt wall portion from fluid tight sealing engagement with the lower lid upper wall, thereby permitting any residual pressurized air within the beverage cavity to escape out the second aperture of the lower lid upper wall.

5. The beverage dispenser of claim 4, wherein the bellows has a corrugated outer wall providing an upward spring force to the bellows, and when the downward force on the actuator is sufficiently reduced after the lower end skirt wall portion is disengaged from fluid tight sealing engagement with the lower lid upper wall, the outer wall of the bellows will move the upper bellows end wall upward and progressively expand the bellows.

6. The beverage dispenser of claim 5, wherein when the downward force on the actuator is sufficiently reduced and the upper bellows end wall moves sufficiently upward, the upper valve will open the upper bellows aperture.

7. The beverage dispenser of claim 1, wherein the skirt wall is convex in curvature in vertical profile with a mid-portion skirt wall portion between the upper and lower end skirt wall portions having a larger transverse wall separation dimension than either one of the upper and lower end skirt wall portions.

8. The beverage dispenser of claim 1, wherein the skirt wall has a mid-portion skirt wall portion between the upper and lower end skirt wall portions, at least one of the lower end skirt wall portion and the mid-portion is flexible enough to flex under a sufficiently high pressure within the beverage cavity of the container body, to act as a blow off or relief valve by releasing a portion of the pressured air in the beverage cavity through the second aperture of the lower lid upper wall.

9. The beverage dispenser of claim 1, wherein when the lower end skirt portion is in fluid tight sealing engagement with the lower lid upper wall, the lower end skirt portion has a flexibility such that when the pressure within the beverage cavity increases to a release pressure at least a portion of the lower end skirt portion will at least momentary separate from the lower lid upper wall and allow at least a portion of the pressure within the beverage cavity to be released out of the second aperture of the lower lid upper wall, and after the release, the lower end skirt portion will move back into fluid tight sealing engagement with the lower lid upper wall, thereby the skirt valve portion serving as a pressure relief valve.

10. The beverage dispenser of claim 1, wherein the spout is movable between a dispensing position and a stored position, and the dispenser may be placed in a locked state with the lower end skirt portion in fluid tight sealing engagement with the lower lid upper wall, and wherein when the spout is in the stored position and the dispenser is in the locked state with the lower end skirt portion in fluid tight sealing engagement with the lower lid upper wall, the lower end skirt portion has a flexibility such that when the pressure within the beverage cavity increases to a release pressure at least a portion of the lower end skirt portion will at least momentary separate from the lower lid upper wall and allow at least a portion of the pressure within the beverage cavity to be released out of the second aperture of the lower lid upper wall, and after the release, the lower end skirt portion will move back into fluid tight sealing engagement with the lower lid upper wall, thereby the skirt valve portion serving as a pressure relief valve.

11. The beverage dispenser of claim 1, wherein the valve assembly further includes a valve support member having a flange portion with a flange aperture and a sidewall portion projecting downward from the flange portion and extending circumferentially about the central flange aperture, the flange portion being attached to the lower bellows end wall and the central flange aperture is in alignment with the lower bellows aperture, the sidewall portion extending through the chamber bottom wall aperture for downward and upward movement of the valve support member with the lower bellows end wall relative to the chamber bottom wall as the bellows is collapsed and expanded, respectively.

12. The beverage dispenser of claim 11, wherein the valve assembly includes a downwardly extending valve base portion, the duckbill valve portion and the skirt valve portion extending downward from the valve base portion, the valve base portion being positioned within the sidewall portion of the valve support member.

13. The beverage dispenser of claim 1, wherein the valve assembly includes a downwardly extending valve base portion, the duckbill valve portion and the skirt valve portion extending downward from the valve base portion, the duckbill valve portion and the skirt valve portion are in coaxial arrangement.

14. The beverage dispenser of claim 1, wherein the duckbill valve portion and the skirt valve portion are in coaxial arrangement.

15. The beverage dispenser of claim 1, wherein the spout is movable between a dispensing position and a stored position.

16. The beverage dispenser of claim 15, wherein the spout is movably disposed in the first aperture of the lower lid upper wall for movement between the dispensing position and the stored position.

17. The beverage dispenser of claim 16, wherein when the spout is in the dispensing position, the spout head is movable upward and rotatable to position the spout head portion above a storage recess in the lower lid upper wall and then movable downward into the storage recess.

18. The beverage dispenser of claim 15, wherein the spout is movable upward and downward, and rotatable within the first aperture of the lower lid upper wall when moving the spout between the dispensing position and the stored position.

19. The beverage dispenser of claim 18, wherein when moving the spout from the dispensing position to the stored position, the spout head is movable upward and rotatable to position the spout head portion above a storage recess in the lower lid upper wall and then movable downward into the storage recess.

20. The beverage dispenser of claim 1, wherein the spout is movable between a dispensing position and a stored position, and when in the stored position the spout head portion is positioned in a storage recess in the lower lid upper wall.

21. The beverage dispenser of claim 20, wherein the storage recess includes an upwardly projecting plug extending into the opening of the outward end portion of the spout head portion and in fluid tight sealing engagement therewith to seal the opening of the outward end portion of the spout head portion while the spout head portion is in the storage recess.

22. The beverage dispenser of claim 1, wherein the spout is movable between a dispensing position and a stored position, the lower lid portion has an upper perimeter wall with a upwardly open perimeter wall recess, the spout head portion includes a laterally extending middle portion between the outward end portion and the inward end portion of the spout head portion, the middle portion extending through the perimeter wall recess and being removable from the perimeter wall recess to move the spout from the dispensing position to the stored position.

23. The beverage dispenser of claim 22, wherein the lid has a closed position with the upper lid portion positioned adjacent to the lower lid portion, and an opened position with the upper lid portion positioned spaced apart from the lower lid portion, and when the middle portion of the spout head portion is within the perimeter wall recess and the lid is in the closed position, the chamber bottom wall is positioned adjacent to the middle portion of the spout head portion and prevents removal of the middle portion of the spout head portion from the perimeter wall recess.

24. The beverage dispenser of claim 22, wherein the lid has a closed position with the upper lid portion positioned adjacent to the lower lid portion, and an opened position with the upper lid portion positioned spaced apart from the lower lid portion, and when the middle portion of the spout head portion is within the perimeter wall recess and the lid is in the closed position, the chamber sidewall is positioned adjacent to the middle portion of the spout head portion and prevents removal of the middle portion of the spout head portion from the perimeter wall recess.

25. The beverage dispenser of claim 1, wherein the outward end portion of the spout head portion has a downturned, discharge outer end portion located outward of the container body and the inward end portion of the spout head portion has an upwardly oriented, inward end portion, and the spout head portion further includes a laterally extending middle portion extending between the outer end portion and the inward end portion, an internal fluid conducting spout channel extends through the outer end portion, the middle portion and the inward end portion of the spout head portion.

26. The beverage dispenser of claim 25, wherein the spout channel has an upright first channel portion extending within the outer end portion, an upright second channel portion extending within the inward end portion, and a laterally extending third channel portion extending within a laterally extending middle portion, and the spout head portion has a wall aperture in a wall of the spout channel at an inward end of the middle portion sized to removably receive a plug therein, the wall aperture being in straight alignment with the third channel portion to provide access the third channel portion when the plug is removed for cleaning of the third channel portion.

27. The beverage dispenser of claim 1, wherein the sidewall of the actuator has a lower end portion with a laterally outward extending sidewall member and a lower end portion of the chamber sidewall has a stop portion with a lower end positioned above the chamber bottom wall, the dispenser being placed in a locked state by moving the actuator downward to the fourth position and then rotating the actuator to place the sidewall member under the stop portion, thereby preventing upward return movement of the actuator and further downward movement of the actuator sufficient to cause the dispensing of beverage in the beverage cavity out of the spout.

28. The beverage dispenser of claim 27, wherein the chamber sidewall has an upwardly oriented guide groove with the sidewall member of the actuator positioned therein, the guide groove limiting the rotation of the actuator as the actuator moves downward toward the fourth position, the guide groove having a lower end connecting with a circumferentially extending groove in the chamber sidewall extending from the lower end of the guide groove to below the lower end of the stop portion through which the sidewall member is moved to limit upward movement of the actuator as the actuator is being rotated to move the sidewall member between the lower end of the guide groove and the lower end of the stop portion.

29. The beverage dispenser of claim 28, wherein an upper side of the circumferentially extending groove is position lower than the lower end of the stop portion, such that when the sidewall member of the actuator moves through the circumferentially extending groove and reaches the lower end of the stop portion, the sidewall member moves upward into engagement with the lower end of the stop member, changing the dispenser from the locked state to an operating state first requiring downward movement of the sidewall member until aligned with the circumferentially extending groove and then rotation of the actuator to move the sidewall member along circumferentially extending groove until in alignment with the lower end of the guide groove.

30. The beverage dispenser of claim 28, wherein the spout is movable between a dispensing position and a stored position, the spout head portion has an upwardly projecting stop member, the lower end portion of the sidewall of the actuator has a laterally outward extending sidewall arm, the stop member of the spout head portion being position to engage the sidewall arm when the spout is in the dispensing position and prevent rotation of the sidewall member to under the stop portion of the lower end portion of the chamber sidewall when the actuator has been moved downward to the fourth position, thereby preventing placing the dispenser in the locked state.

31. The beverage dispenser of claim 30, wherein when the spout is in the stored position, the spout head portion is positioned in a storage recess in the lower lid upper wall, whereat the stop member of the spout head portion is out of position for engaging the sidewall arm and preventing rotation of the sidewall member to under the stop portion of the lower end portion of the chamber sidewall when the actuator has been moved downward to the fourth position, thereby the stop member of the spout head portion will not prevent placing the dispenser in the locked state when the spout is in the stored position.

32. The beverage dispenser of claim 1, wherein the upper lid portion is rotatably coupled to the lower lid portion for rotation of the upper lid portion relative to the lower lid portion about a transverse axis of rotation between a closed position where the upper lid portion is rotated downward to a position adjacent to the lower lid portion and an opened position where the upper lid portion is rotated upward to a position spaced apart from the lower lid portion.

33. The beverage dispenser of claim 32, wherein when the upper lid portion is in the opened position, the second aperture of the lower lid upper wall is exposed for addition of beverage to the beverage cavity through the second aperture.

34. The beverage dispenser of claim 32, further including at least one releasable lock member operable to securely hold upper lid portion adjacent to the lower lid portion when in the closed position.

35. The beverage dispenser of claim 1, wherein the upper lid portion chamber within which the bellows is positioned has a circumferentially extending, chamber sidewall.

36. The beverage dispenser of claim 1, wherein the lower lid portion has a lower lid compartment positioned below the lower lid upper wall, the lower lid compartment has an upwardly open end with the lower lid upper wall closing the upwardly open end of the lower lid compartment to define a fluid tight sealed compartment therewithin, first and second lower lid through passageways extend upwardly and fully through the fluid tight compartment, each having an upper end aperture and a lower end aperture, the upper end apertures of the first and second lower lid through passageways being in alignment with the first and second apertures of the lower lid upper wall, respectively, the first and second lower lid through passageways being out of fluid communication with the fluid tight compartment.

37. The beverage dispenser of claim 36, wherein at least one of the inward end portion of the spout head portion and the upper end portion of the spout feed conduit extends through the first lower lid through passageway.

38. The beverage dispenser of claim 36, further including a block of insulating material positioned within the fluid tight compartment, the block having first and second block through passageways extend upwardly and fully through the block with the first and second lower lid through passageways extending upwardly and fully through the first and second block through passageways, respectively.

39. The beverage dispenser of claim 38, wherein the block fits snuggly within the fluid tight compartment.

40. The beverage dispenser of claim 1, further including a collar attached to the body upper end portion, and a handle having first and second handle support portions and a grippable handle portion, the first handle support portion having a first end portion rotatably attached to the collar and a second end portion connected to a first end portion of the grippable handle portion, and the second handle support portion having a first end portion rotatably attached to the collar and a second end portion connected to a second end portion of the grippable handle portion.

41. The beverage dispenser of claim 40, wherein the first handle support portion further includes a middle handle portion located between the first and second end portions of the first handle support portion, the middle handle portion of the first handle support portion having an inward portion and an outward portion defining a pass through attachment opening therebetween, which is fully encircled by the inward and outward portions.

42. The beverage dispenser of claim 41, wherein the second handle support portion further includes a middle handle portion located between the first and second end portions of the second handle support portion, the middle handle portion of the second handle support portion having an inward portion and an outward portion defining a pass through attachment opening therebetween, which is fully encircled by the inward and outward portions.

43. An airpot beverage dispenser for dispensing a beverage, comprising:
    a container body with a body upper end portion and a beverage cavity for holding the beverage;
    a lid attachable to the body upper end portion, the lid having an upwardly open lid chamber and a lid lower wall having a lid lower wall aperture;
    an outlet through which beverage contained in the beverage cavity is dispensed;
    a bellows positioned at least partially within the lid chamber, the bellows having a first bellows aperture and a second bellows aperture, the bellows being downwardly collapsible;
    a bellows valve closing the first bellows aperture when the bellows is being downwardly collapsed to trap air in the bellows;
    an actuator downwardly movable to apply a downward force on the bellows to progressively downwardly collapse the bellows to increase the pressure of the trapped air in the bellows; and
    a valve assembly including:
        a skirt valve portion having a skirt wall with an upper end skirt wall portion and a flexible lower end skirt wall portion, the lower end skirt wall portion defining a skirt wall aperture, downward movement of the actuator moving the lower end skirt wall portion into fluid tight sealing engagement with the lid lower wall with the lower end skirt wall portion extending about the lid lower wall aperture; and
        a duckbill valve portion having an upper duckbill valve portion and a lower duckbill valve portion, the upper duckbill valve portion being in fluid communication with the second bellows aperture, the upper end skirt wall portion being in fluid tight sealing engagement with the upper duckbill valve portion and the lower end skirt wall portion extending about the lower duckbill valve portion, the lower duckbill valve portion having a normally closed exit aperture opened when the air pressure within the lower duckbill valve portion is above a duckbill valve opening pressure, downward movement of the actuator after the lower end skirt wall portion is in fluid tight sealing engagement with the lid lower wall further collapses the bellows and further increases the pressure of the trapped air in the bellows, when the pressure of the trapped air in the bellows is above the duckbill valve opening pressure, the exit aperture opens and completes a fluid passageway for the trapped air in the bellows to pass into the beverage cavity through the lid lower wall aperture.

44. The beverage dispenser of claim 43, wherein after the trapped air in the bellows passes into the beverage cavity through the lid lower wall aperture, the exit aperture automatically closes.

45. The beverage dispenser of claim 43, wherein after the trapped air in the bellows passes into the beverage cavity through the lid lower wall aperture and the downward force on the actuator is sufficiently reduced, the lower end skirt wall portion is moveable upward sufficient to disengage the lower end skirt wall portion from fluid tight sealing engagement with the lid lower wall, thereby permitting any residual pressurized air within the beverage cavity to escape out the lid lower wall aperture.

46. The beverage dispenser of claim 43, wherein when the lower end skirt portion is in fluid tight sealing engagement with the lid lower wall, the lower end skirt portion has a flexibility such that when the pressure within the beverage cavity increases to a release pressure at least a portion of the lower end skirt portion will at least momentary separate from the lid lower wall and allow at least a portion of the pressure within the beverage cavity to be released out of the lid lower wall aperture, and after the release, the lower end skirt portion will move back into fluid tight sealing engagement with the lid lower wall, thereby the skirt valve portion serving as a pressure relief valve.

47. The beverage dispenser of claim 43, wherein the outlet is movable between a dispensing position and a stored position, and the dispenser may be placed in an operating state or in a locked state by rotating the actuator, and wherein the outlet has an upwardly projecting stop member and the actuator has a laterally outward extending actuator arm, and when the outlet is in the dispensing position, rotation of the actuator to change the dispenser from the operating state to the locked state is prevented by the stop member of the outlet being in position to engage the actuator arm.

48. The beverage dispenser of claim 47, wherein the outlet is movable to the stored position by rotating the outlet into a storage recess in the lid lower wall, and then moving the outlet downward into the storage recess, when the outlet is in the storage recess, the stop member of the outlet is not in a position to engage the actuator arm.

49. An airpot beverage dispenser for dispensing a beverage, comprising:
- a container body with a body upper end portion and a beverage cavity for holding the beverage;
- a lid attachable to the body upper end portion, the lid having an upwardly open lid chamber with a lid lower wall having a lid lower wall aperture;
- an outlet through which beverage contained in the beverage cavity is dispensed;
- a bellows positioned at least partially within the lid chamber, the bellows having a bellows aperture, the bellows being downwardly collapsible;
- an actuator downwardly movable to apply a downward force on the bellows to progressively downwardly collapse the bellows to increase the pressure of the trapped air in the bellows; and
- a valve assembly including:
- a skirt valve portion having a skirt wall with an upper end skirt wall portion and a flexible lower end skirt wall portion, the lower end skirt wall portion defining a skirt wall aperture, downward movement of the actuator moving the lower end skirt wall portion into fluid tight sealing engagement with the lid lower wall with the lower end skirt wall portion extending about the lid lower wall aperture; and
- a duckbill valve portion positioned within the skirt valve portion and in fluid communication with the bellows aperture, the duckbill valve portion having a normally closed exit aperture which opens when the air pressure within the duckbill valve portion is above a duckbill valve opening pressure, when the pressure of the trapped air in the bellows is above the duckbill valve opening pressure and the lower end skirt wall portion is in fluid tight sealing engagement with the lid lower wall, the exit aperture opening completes a fluid passageway for the trapped air in the bellows to pass into the beverage cavity through the lid lower wall aperture.

50. The beverage dispenser of claim 49, wherein when the lower end skirt portion is in fluid tight sealing engagement with the lid lower wall, the lower end skirt portion has a flexibility such that when the pressure within the beverage cavity increases to a release pressure at least a portion of the lower end skirt portion will at least momentary separate from the lid lower wall and allow at least a portion of the pressure within the beverage cavity to be released out of the lid lower wall aperture, and after the release, the lower end skirt portion will move back into fluid tight sealing engagement with the lid lower wall, thereby the skirt valve portion serving as a pressure relief valve.

51. The beverage dispenser of claim 49, wherein the outlet is movable between a dispensing position and a stored position, and the dispenser may be placed in an operating state or in a locked state by rotating the actuator, and wherein the outlet has an upwardly projecting stop member and the actuator has a laterally outward extending actuator arm, and when the outlet is in the dispensing position, rotation of the actuator to change the dispenser from the operating state to the locked state is prevented by the stop member of the outlet being in position to engage the actuator arm.

52. The beverage dispenser of claim 51, wherein the outlet is movable to the stored position by rotating the outlet into a storage recess in the lid lower wall, and then moving the outlet downward into the storage recess, when the outlet is in the storage recess, the stop member of the is not in a position to engage the actuator arm.

53. The beverage dispenser of claim 43, wherein the lid further includes a chamber bottom wall having a chamber bottom wall aperture, the chamber bottom wall being above the lid lower wall, the bellows further includes a lower bellows end wall with the second bellows aperture, and at least a portion of the valve assembly is attached to the lower bellows end wall for downward movement therewith and extends through the chamber bottom wall.

54. The beverage dispenser of claim 49, wherein after the trapped air in the bellows passes into the beverage cavity through the lid lower wall aperture and the downward force on the actuator is sufficiently reduced, the lower end skirt wall portion is moveable upward sufficient to disengage the lower end skirt wall portion from fluid tight sealing engagement with the lid lower wall, thereby permitting any residual pressurized air within the beverage cavity to escape out the lid lower wall aperture.

* * * * *